No. 691,329. Patented Jan. 14, 1902.
P. S. SMITH.
BOX COVERING MACHINE.
(Application filed July 23, 1901.)
(No Model.) 15 Sheets—Sheet 1.
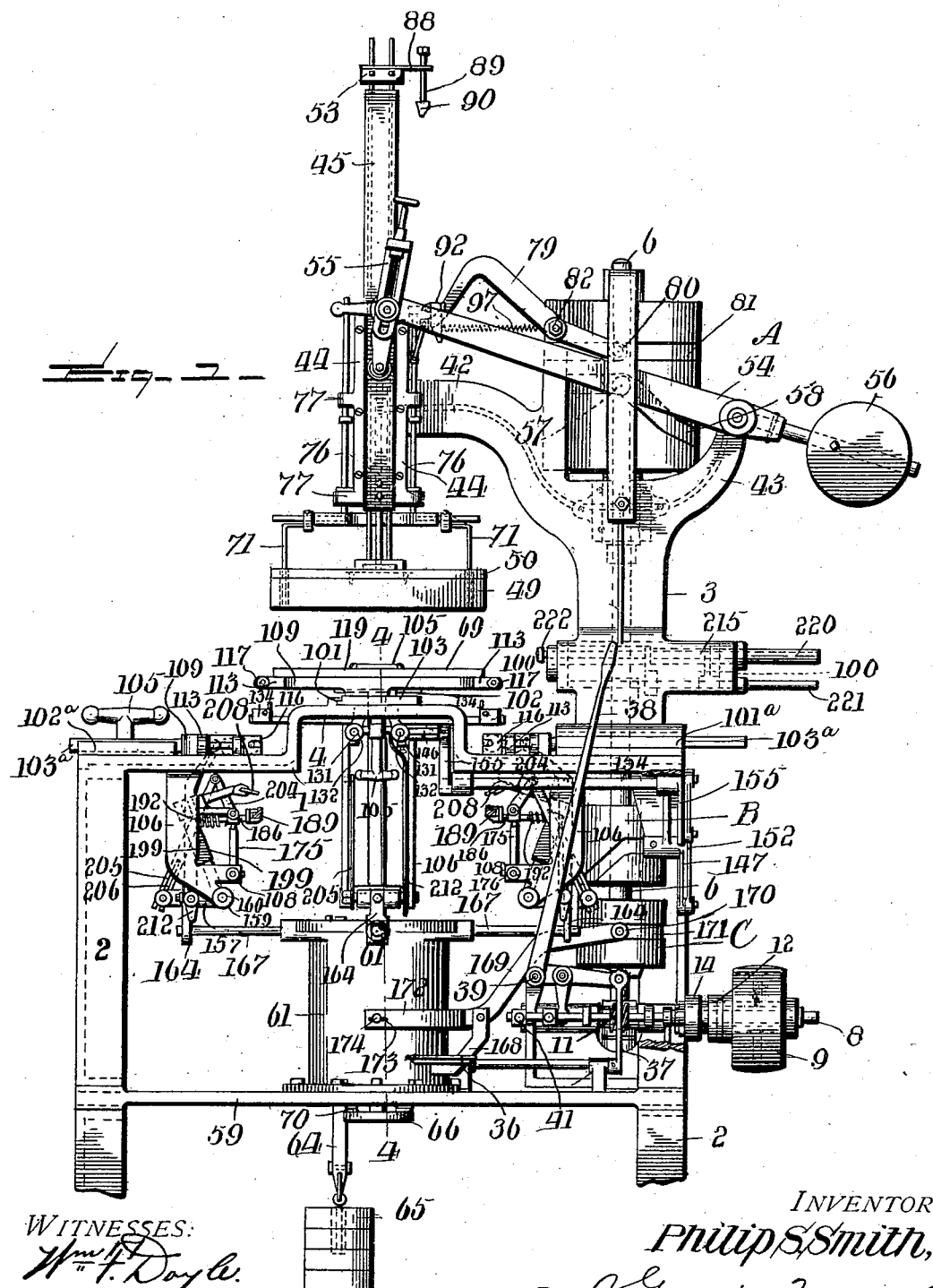
WITNESSES:
INVENTOR
Philip S. Smith,
BY J. Granville Meyers
Attorney

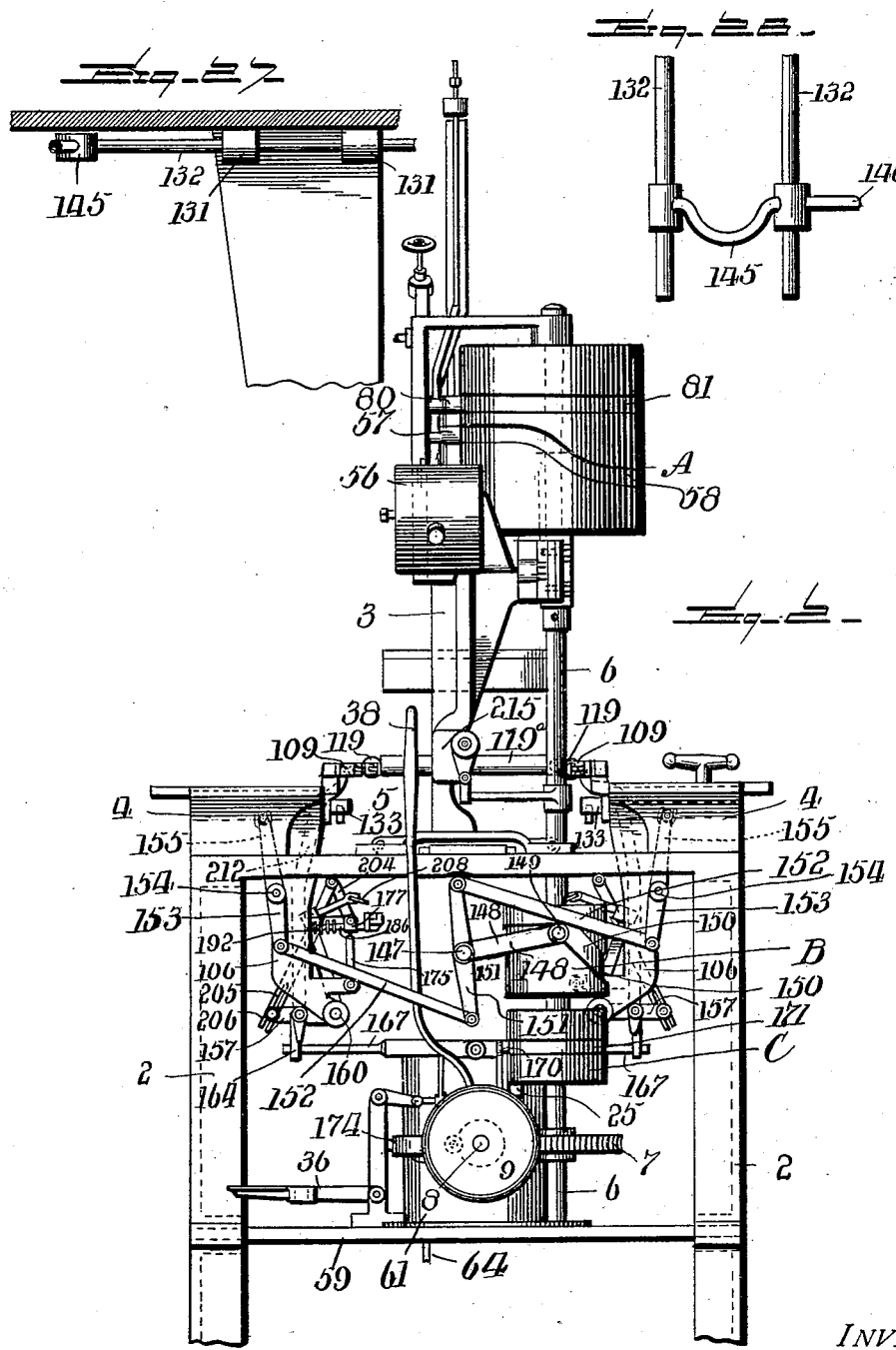

No. 691,329. Patented Jan. 14, 1902.
P. S. SMITH.
BOX COVERING MACHINE.
(Application filed July 23, 1901.)
(No Model.) 15 Sheets—Sheet 3.
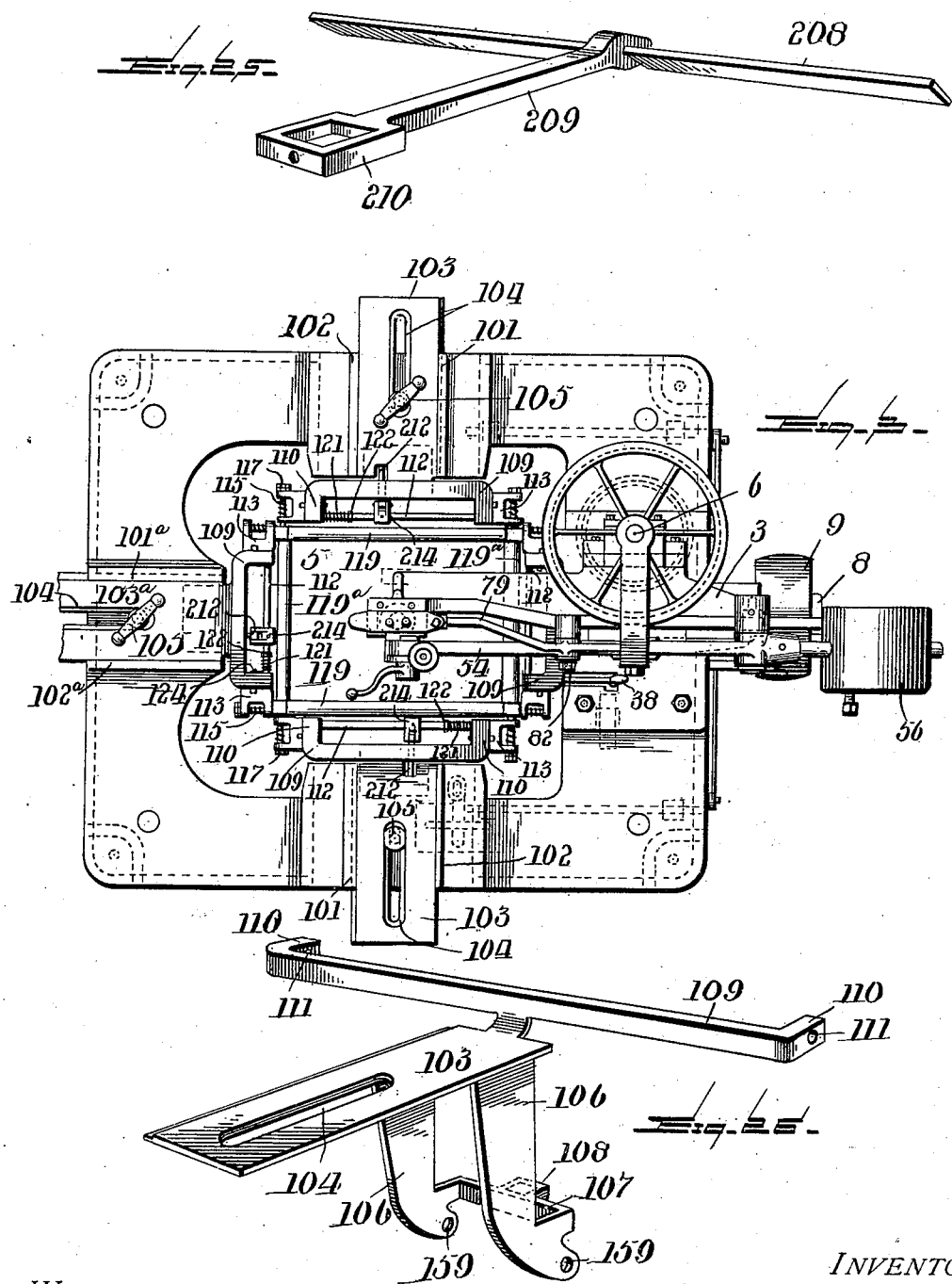
WITNESSES:
Wm. F. Doyle.
W. H. Clarke
INVENTOR
Philip S. Smith,
BY J. Granville Meyers
Attorney No. 691,329. Patented Jan. 14, 1902.
P. S. SMITH.
BOX COVERING MACHINE.
(Application filed July 23, 1901.)
(No Model.) 15 Sheets—Sheet 4.
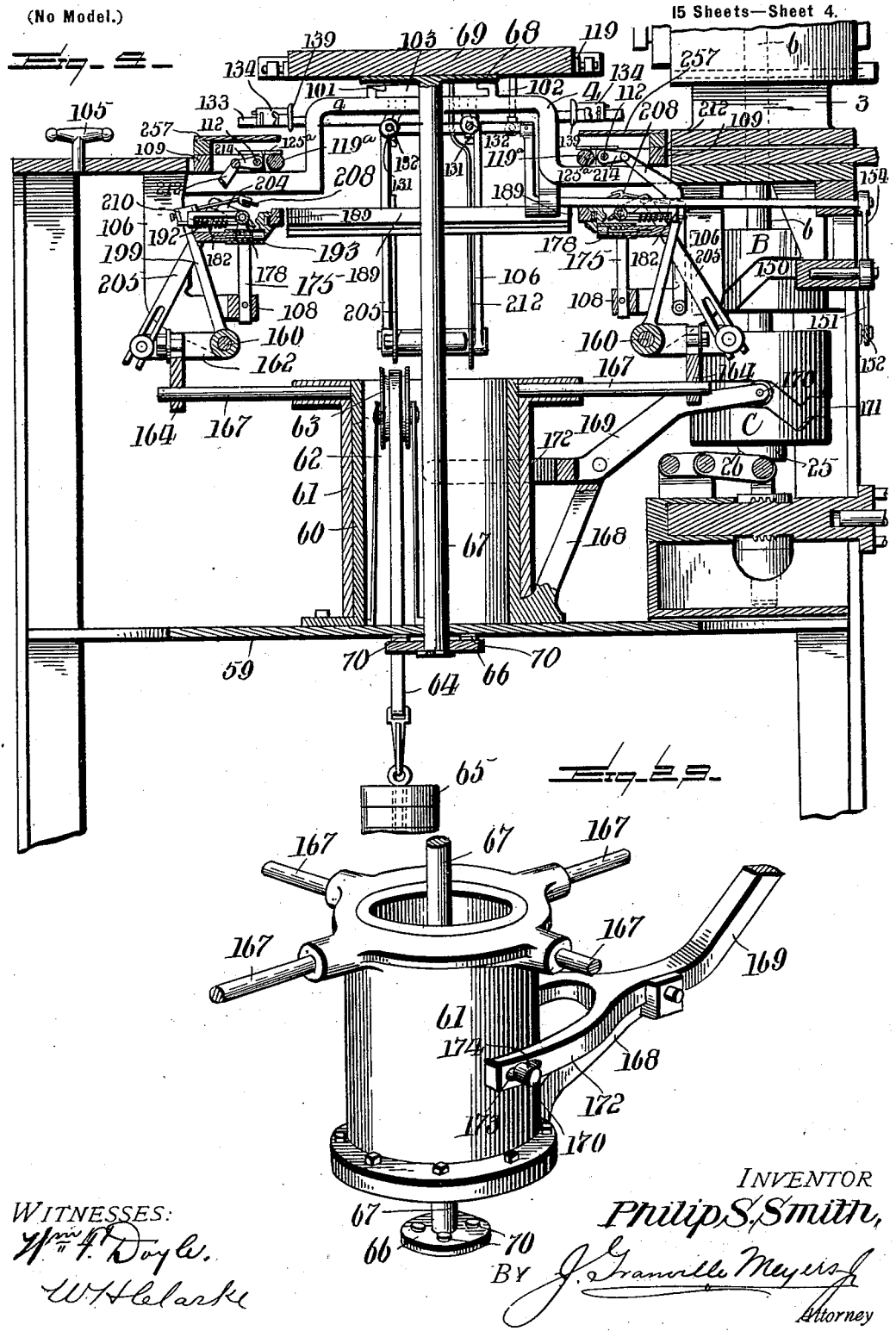
WITNESSES:
INVENTOR
Philip S. Smith,
BY J. Granville Meyers
Attorney

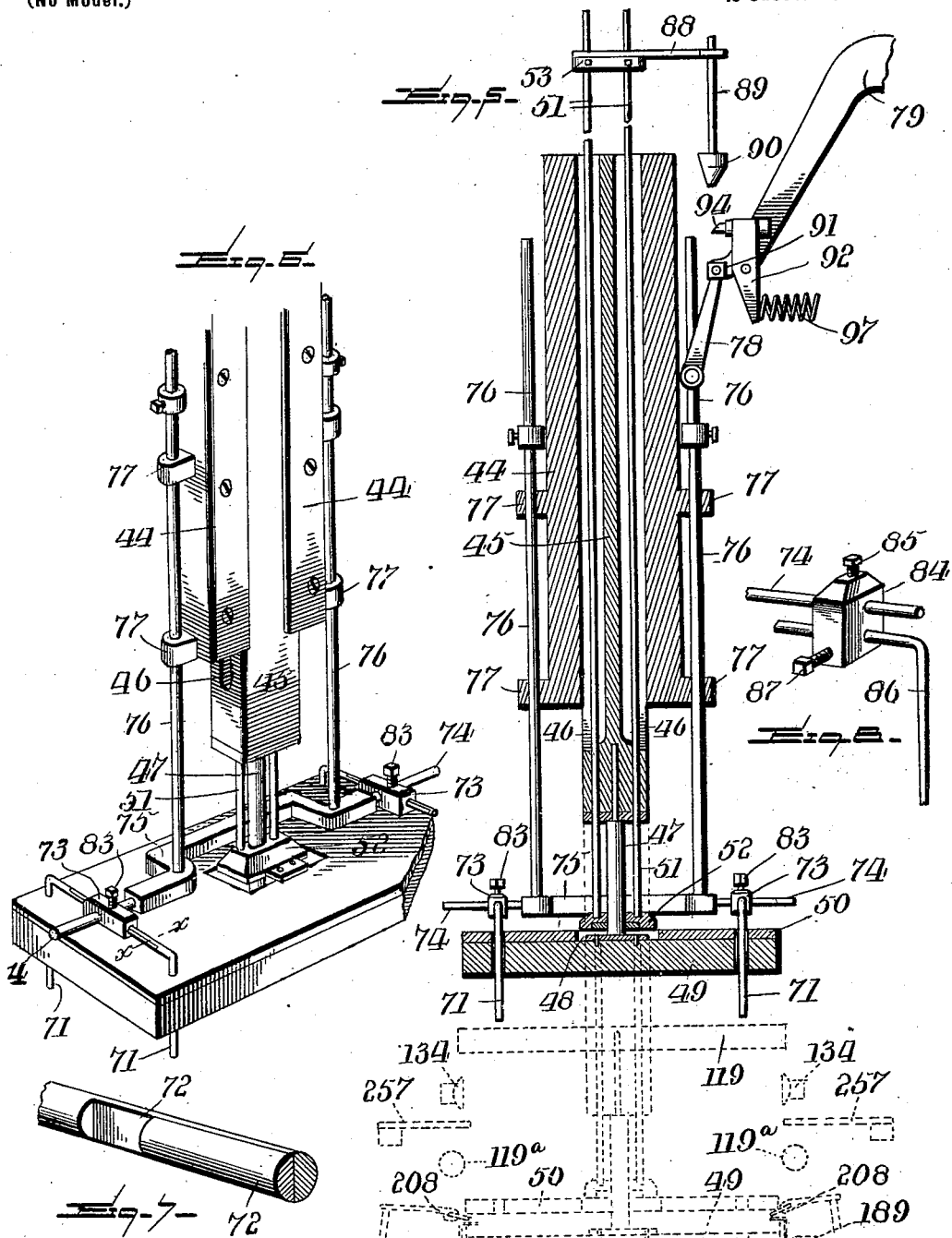

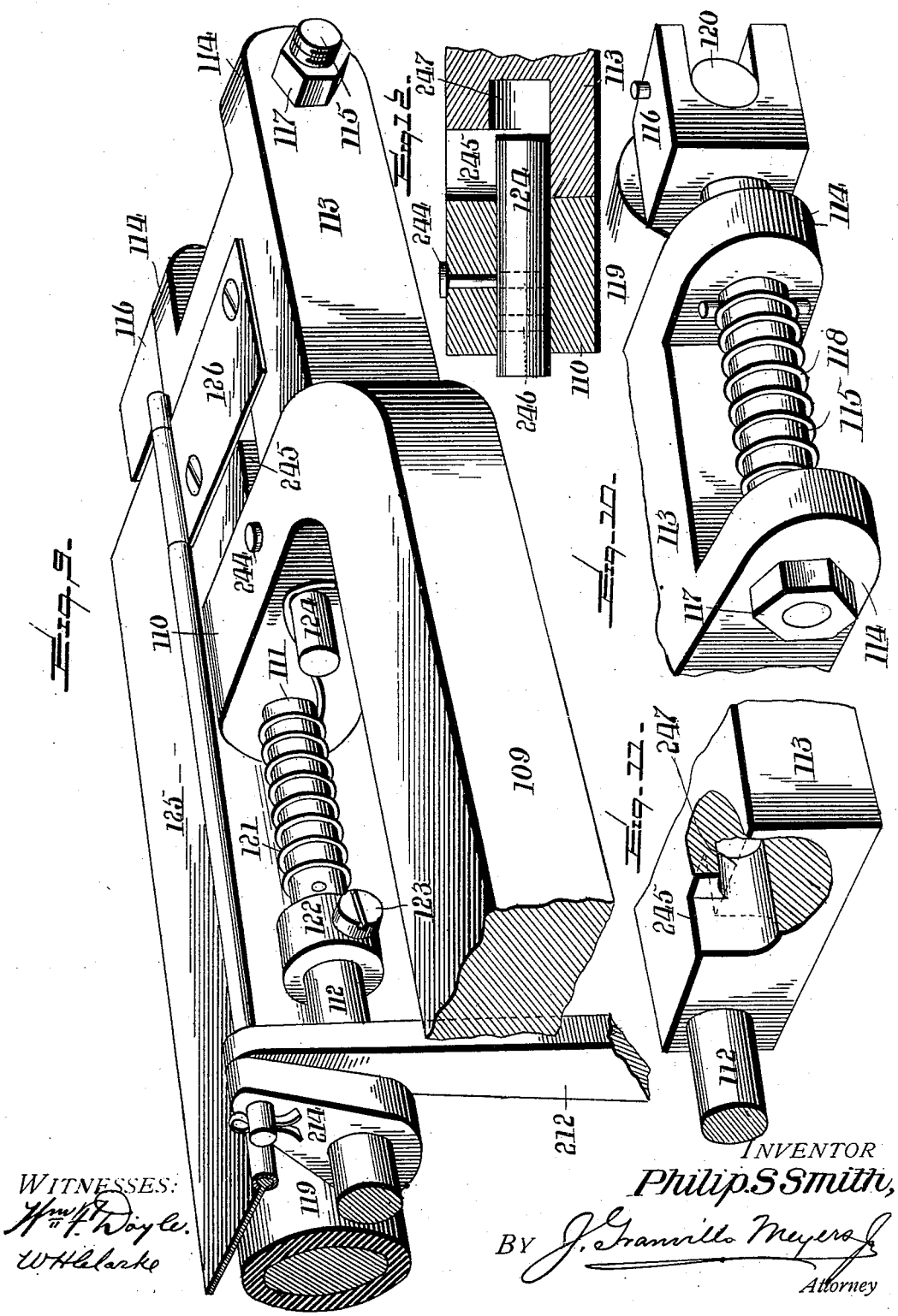

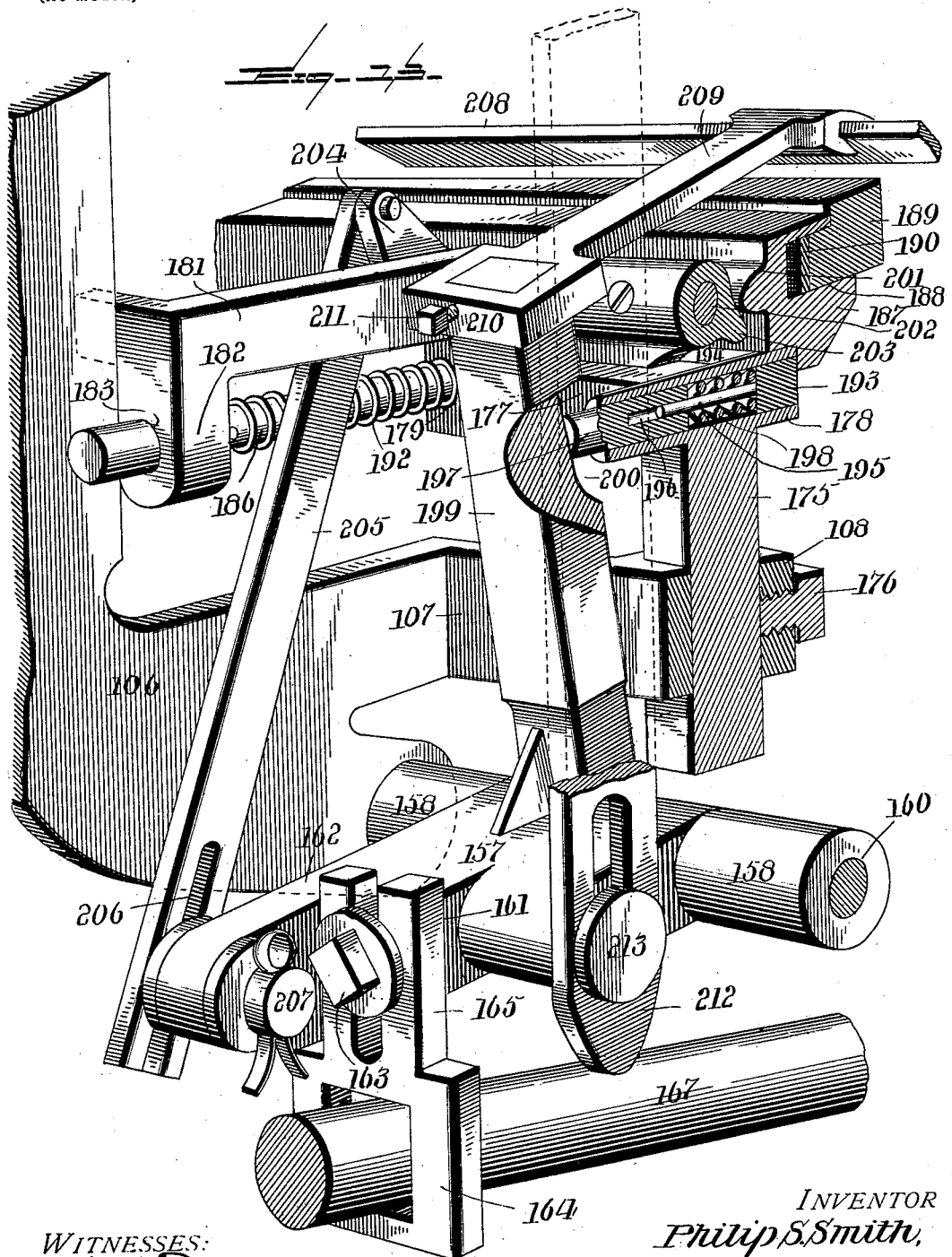

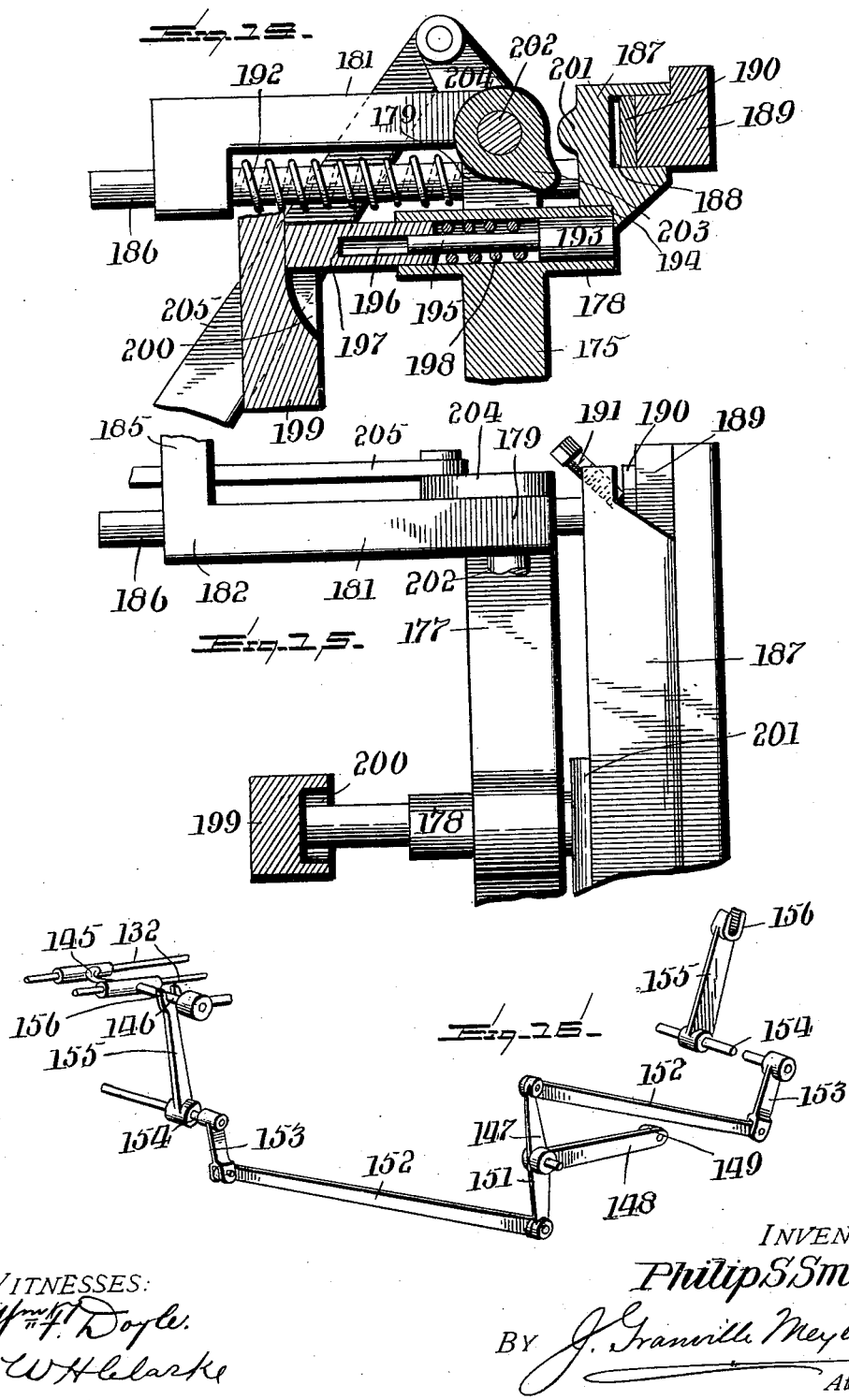

No. 691,329. Patented Jan. 14, 1902.
P. S. SMITH.
BOX COVERING MACHINE.
(Application filed July 23, 1901.)
(No Model.) 15 Sheets—Sheet 9.
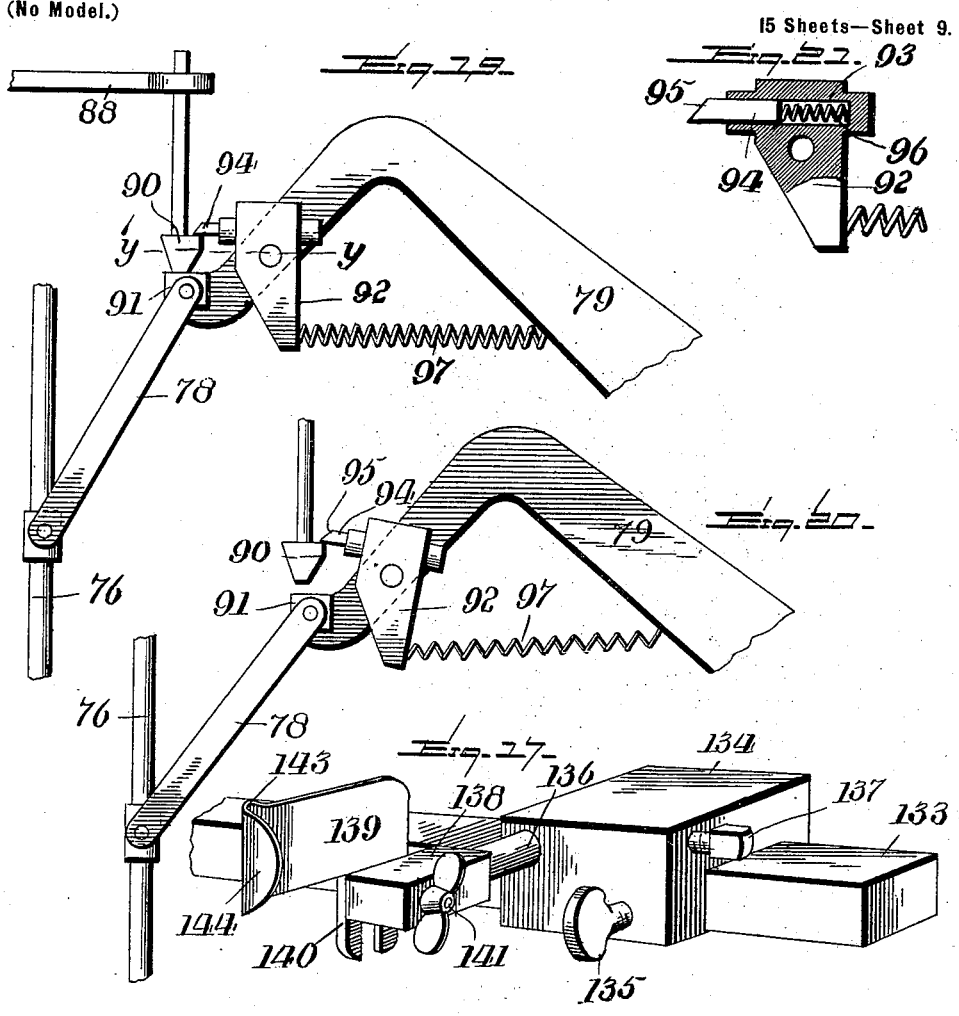
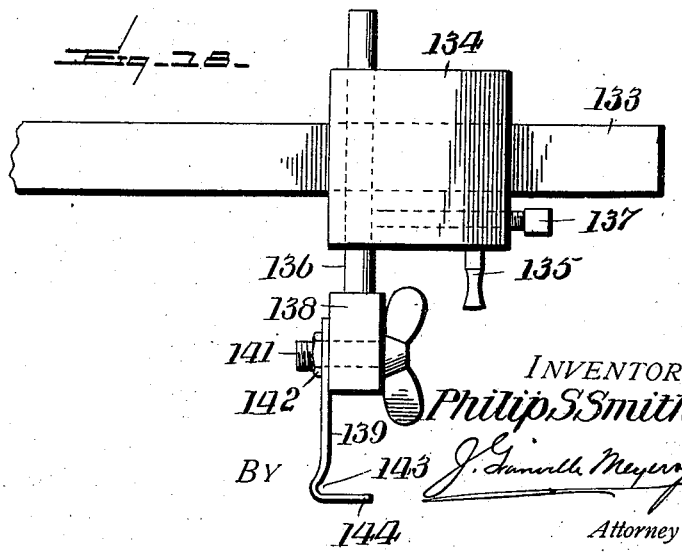
WITNESSES:
Wm F Doyle
W H Clarke
INVENTOR
Philip S Smith
BY
Attorney

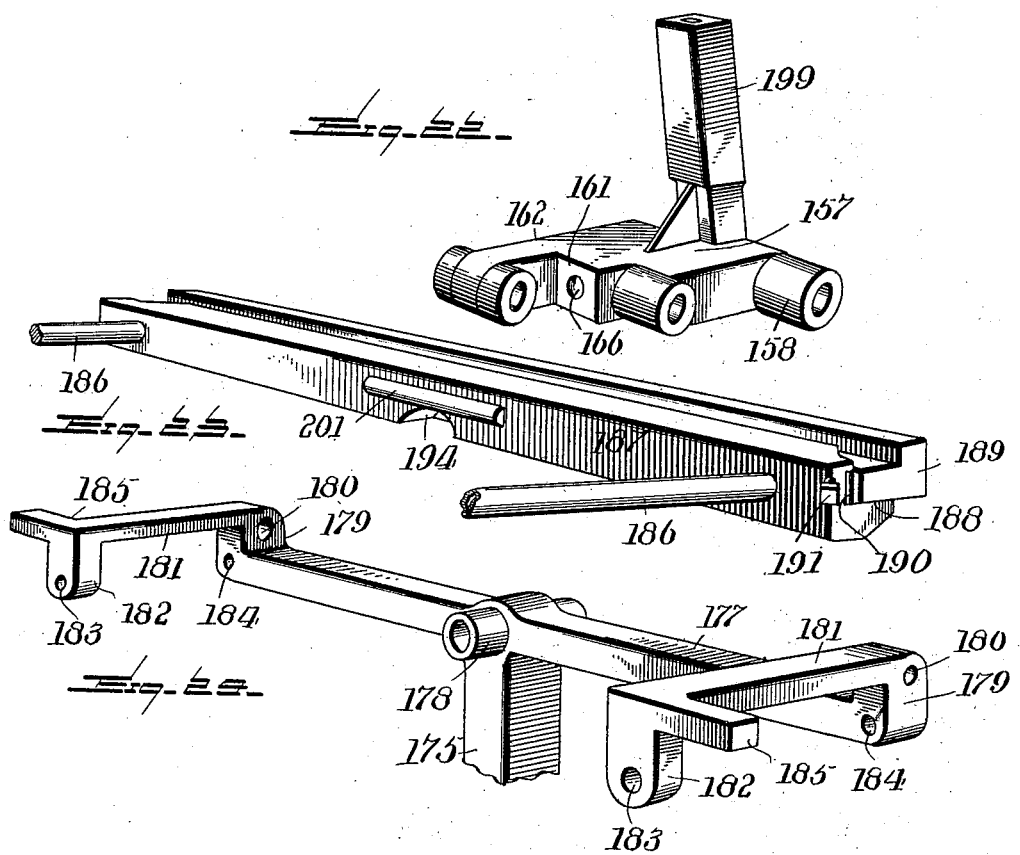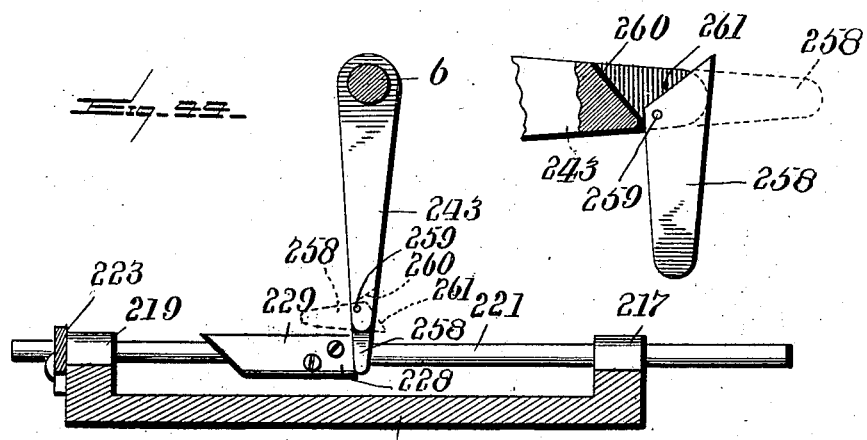

No. 691,329. Patented Jan. 14, 1902.
P. S. SMITH.
BOX COVERING MACHINE.
(Application filed July 23, 1901.)
(No Model.) 15 Sheets—Sheet 11.
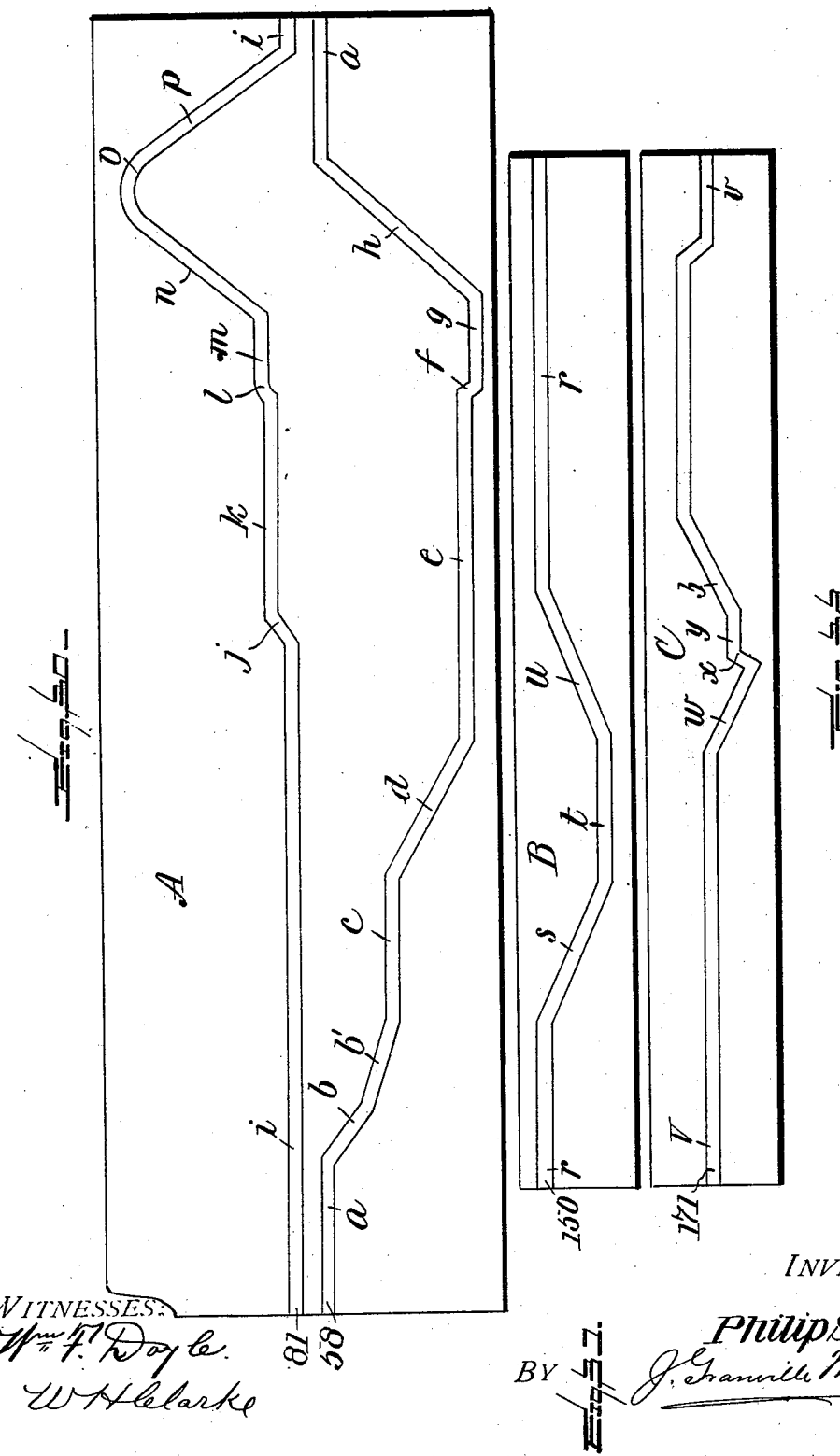
INVENTOR
Philip S. Smith, No. 691,329. Patented Jan. 14, 1902.
P. S. SMITH.
BOX COVERING MACHINE.
(Application filed July 23, 1901.)
(No Model.) 15 Sheets—Sheet 12.
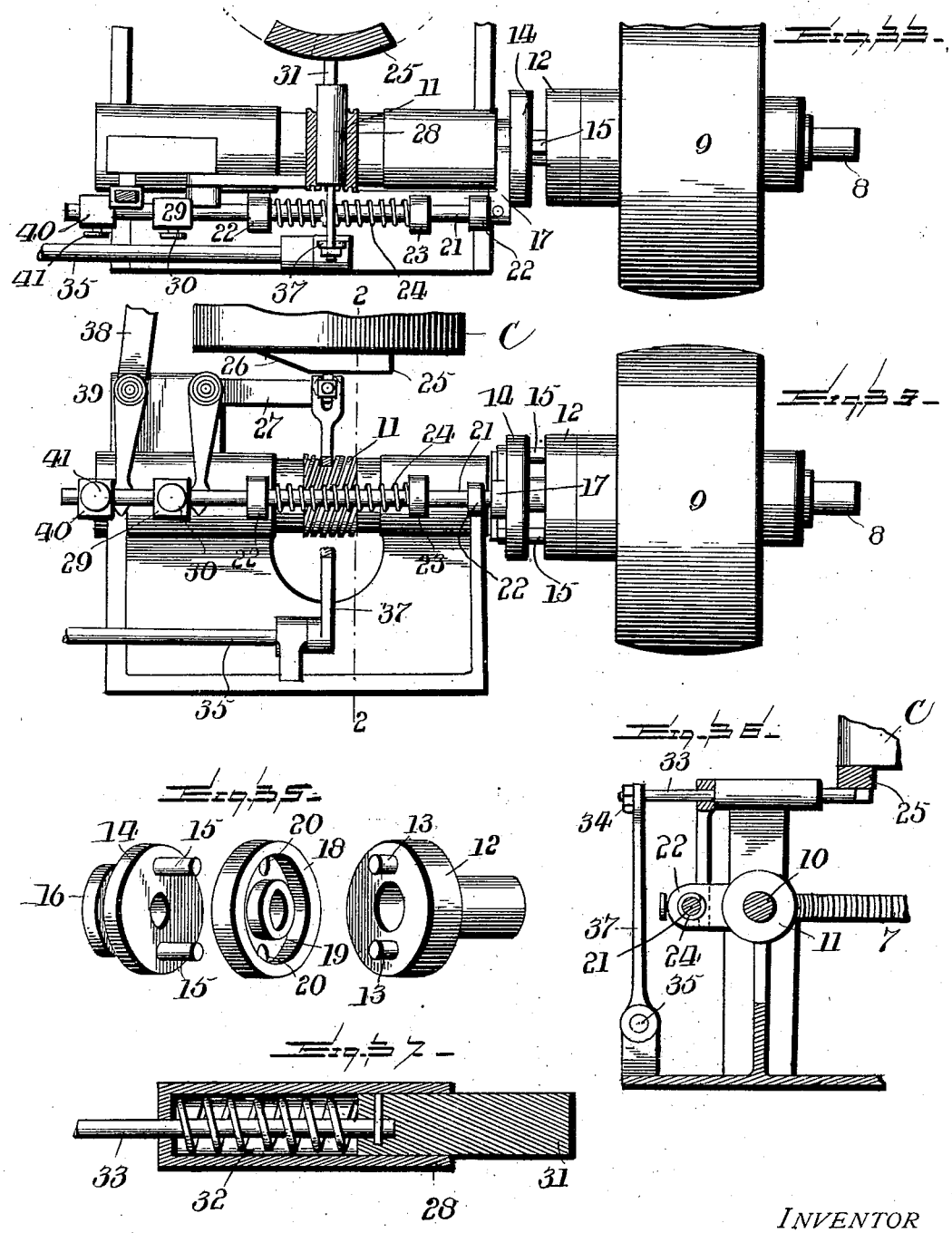
WITNESSES:
INVENTOR
Philip S. Smith,
BY J. Granville Meyers
Attorney

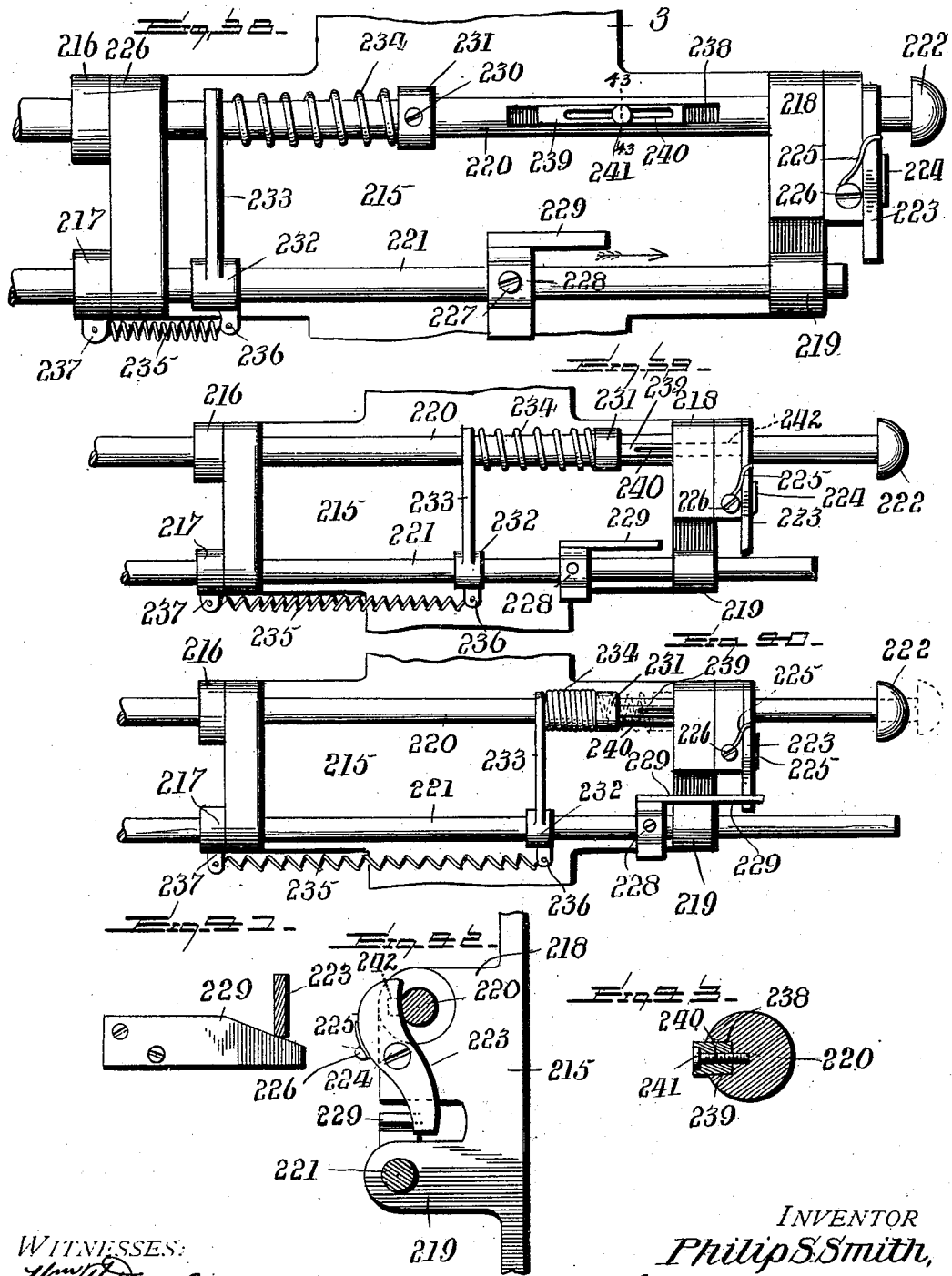

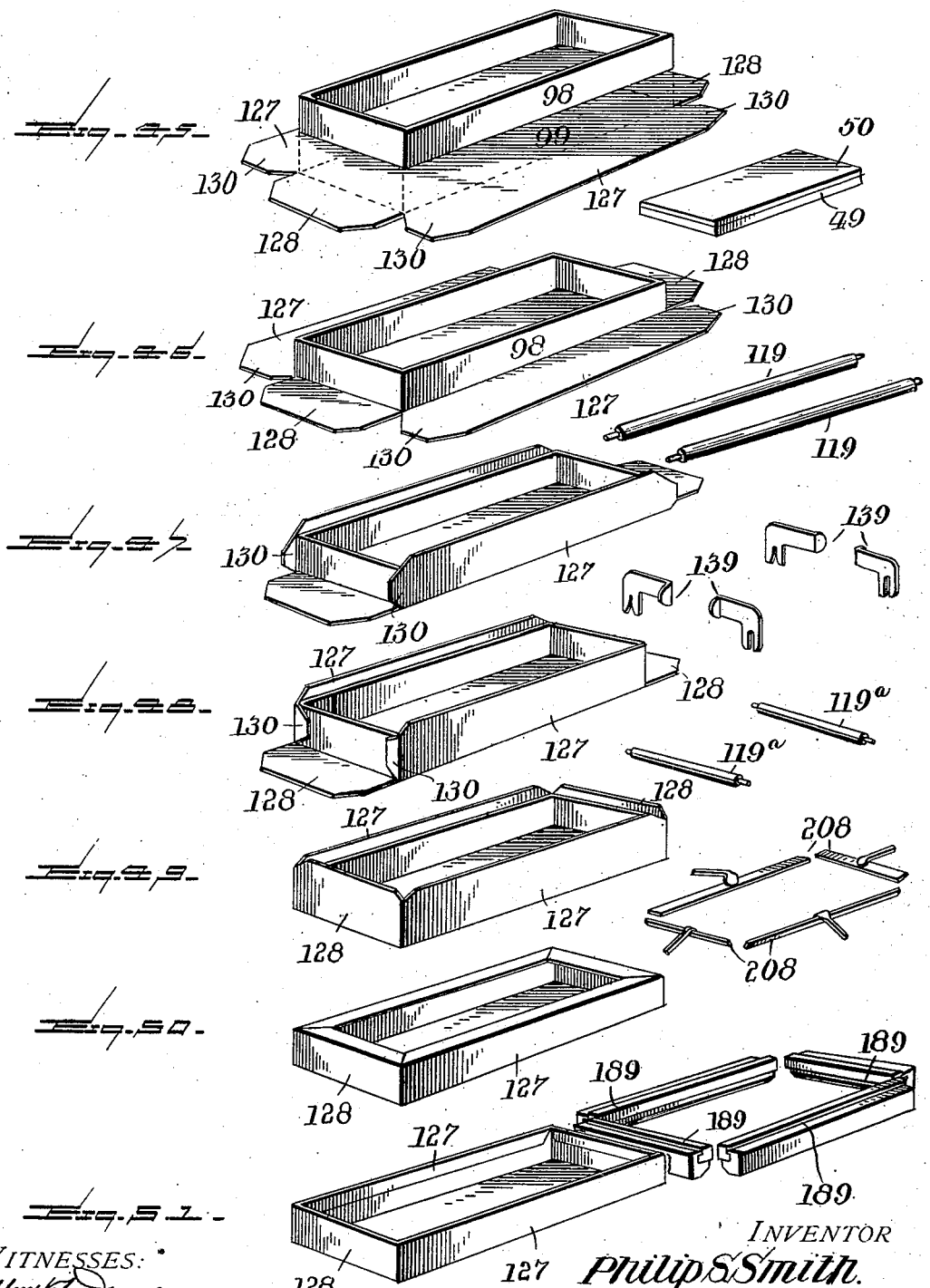

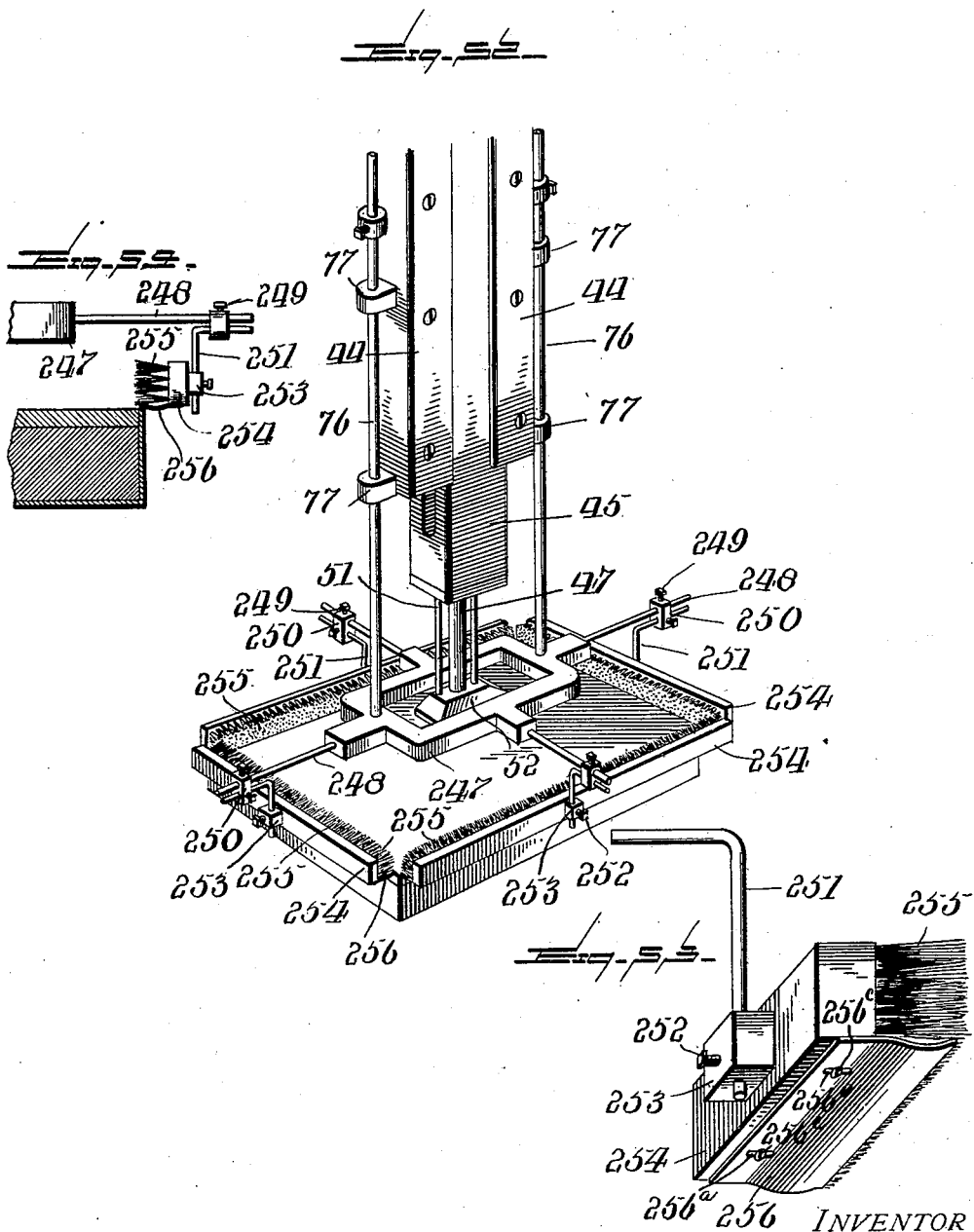

UNITED STATES PATENT OFFICE.

PHILIP S. SMITH, OF BROOKLYN, NEW YORK, ASSIGNOR OF THREE-FOURTHS TO HARRY B. SMITH, OF BROOKLYN, NEW YORK, J. STOGDELL STOKES, OF MOORESTOWN, NEW JERSEY, AND WINFIELD SCOTT SMITH, OF PAWTUCKET, RHODE ISLAND.

BOX-COVERING MACHINE.

SPECIFICATION forming part of Letters Patent No. 691,329, dated January 14, 1902.

Application filed July 23, 1901. Serial No. 69,378. (No model.)

*To all whom it may concern:*

Be it known that I, PHILIP S. SMITH, a citizen of the United States, residing at Brooklyn, in the State of New York, have invented new and useful Improvements in Box-Covering Machines, of which the following is a specification.

My present invention relates to certain new and useful improvements in box-covering machines of the general type shown in the patent to Smith and Bullock, No. 588,887, dated August 24, 1897, and in my pending application, Serial No. 35,613, filed November 6, 1900.

It is the purpose of this invention to overcome certain difficulties found to exist in the previously-constructed machines, to greatly simplify and improve the structural organization of parts, and to render the same more efficient in operation and less liable to get out of order. It has been discovered from practical experiments with machines of this type that the covering devices or rollers are often smeared with gum or glue from the form-block carried by the plunger, said glue being imparted to the form-block by the coated side of the covering material or blank coming in contact therewith during the movement of the plunger between the covering devices, with the result that on the next movement of the plunger between the covering devices or rollers (the latter being smeared with glue) said glue will be imparted to the face side of the covering material or blank, and thus soil and damage the covered box. In my aforesaid application this objection was overcome by providing flexible guard-strips below the rollers that were caused during the ascent of the plunger to wrap around and cover the rollers to protect them. In the present invention, however, instead of using the guard-strips referred to I provide means for automatically moving the rollers out of the path of movement of the plunger during its ascent, so that the latter does not come in contact with the rollers at all during its upstroke or return movement, and this moving or shifting of the rollers constitutes one of the salient features of the present invention.

It is a further purpose of the present invention to provide novel cleaning devices that engage the sides of the plunger as it is withdrawn from the box to clean the sides of the plunger and to combine with such cleaning devices strippers that operate to hold the box while the plunger is withdrawn therefrom. It has also been found that the sides and ends of the boxes, and particularly large boxes, have a tendency to bulge or flare outward between their ends after they have passed between the covering-rollers, so that when the edge-tuck-in fingers are brought into operation the edges of the covering material or blank will not be tucked in smoothly or evenly. In other words, the covering material is liable to pucker or wrinkle. To obviate this objection, I have provided means termed "presser-blocks" for firmly pressing and holding all sides of the box perfectly square and close up against the sides of the plunger-form blocks, so that when the tuck-in fingers are brought into operation the edges of the covering material will be tucked in evenly and without liability to crease or pucker. I also provide means for imparting a primary and then a secondary movement to the presser-blocks to give two distinct pressures to the covered box, whereby the same is brought to perfect shape and the covering material firmly affixed thereto, and these operations form further important features of the present invention.

Another important feature of the invention resides in the fact that each set of presser-blocks, edge-tuck-in fingers, and roller moving or tipping means is mounted on a common support or bracket that is adjustable, so that these three elements may be easily and quickly adjusted simultaneously.

A further feature of the invention is a rising and falling frame or part operatively connected to the said presser-blocks, edge-tuck-in fingers, and roller tipping or moving means, whereby all four sets of these devices may be operated simultaneously, the movement to said rising and falling frame or part being derived from a single cam on the main shaft of the machine.

It is a further purpose of the invention to construct various parts of the mechanism in such manner that they may be easily and quickly detached and adjusted, whereby the machine may accommodate and operate upon boxes of varying sizes.

It is a still further purpose of the invention to provide novel and simple mechanism for ejecting the finished or covered box from the machine, said ejector mechanism being automatic in its operation.

My invention also has for its object to provide means for throwing the ejector mechanism out of operative position in order that the boxes may be left in convenient position for inspection until the machine has been accurately and properly adjusted to do the required work.

To these and other ends the invention finally comprises the novel features of construction and combinations and arrangements of parts hereinafter referred to with more particularity and then finally treated in the claims which follow this specification.

In order to enable others skilled in the art to understand, make, and use my said invention, I will now proceed to describe the same in detail, reference being had for this purpose to the accompanying drawings, wherein like numerals and letters of reference indicate like parts throughout the several views.

In the said drawings, Figure 1 is a view in front elevation of my improved machine. Fig. 2 is an end elevation of the same. Fig. 3 is a top plan view. Fig. 4 is a sectional view taken on the line 4 4 of Fig. 1. Fig. 5 is a vertical central sectional view of the plungers. Fig. 6 is a perspective view of the same. Fig. 7 is a detail view of a portion of one of the pairs of stripper-fingers. Fig. 8 is a similar view of a modification thereof. Fig. 9 is a detail perspective view of a portion of one of the covering devices and its guard strip or protector. Fig. 10 is a similar view of one of the supports or bearings of said covering device. Fig. 11 is a similar view, partially broken away, of one end of the supporting-frame of the covering device. Fig. 12 is a sectional view illustrating the means for locking said frame against tilting. Fig. 13 is a detail perspective view of a portion of the presser mechanism. Fig. 14 is a vertical sectional view of the same. Fig. 15 is an end view thereof. Fig. 16 is a perspective view of the lever mechanism for actuating the covering devices. Fig. 17 is a detail perspective view of one of the end-turn-in wings. Fig. 18 is a top plan view of the same. Fig. 19 is a detail view of the cam mechanism for controlling the movement of the upper plunger. Fig. 20 is a similar view showing the parts in a different position. Fig. 21 is a detail view of the latch shown in Figs. 19 and 20. Fig. 22 is a detail perspective view of the bell-crank or angle-lever shown in Fig. 13. Fig. 23 is a similar view of one of the presser-blocks. Fig. 24 is a similar view of the frame carrying the presser-block. Fig. 25 is a detail perspective view of one of the tuck-in fingers. Fig. 26 is a similar view of one of the adjustable supports for carrying the covering devices. Fig. 27 is a sectional view of a portion of the same. Fig. 28 is a detail top plan view of a portion of the mechanism for actuating the upper covering devices. Fig. 29 is a detail perspective view of the vertically rising and falling frame for actuating the lower covering devices, the presser-blocks and the edge-tuck-in fingers. Figs. 30, 31, and 32 are diagrammatic views, respectively, of the three cams A, B, and C, which operate to actuate all the operative parts of the box-covering machinery. Fig. 33 is a top plan view of the clutch mechanism for starting and stopping the machine. Fig. 34 is a view in side elevation of the same. Fig. 35 is a detail perspective view of the members of the clutch separated. Fig. 36 is a detail view of a part of the clutch mechanism. Fig. 37 is a detail longitudinal sectional view of the spring-bolt engaged by the cam. Fig. 38 is a view in elevation of the ejector for discharging the completely-covered box from the machine. Fig. 39 is a similar view showing the parts in a different position. Fig. 40 is a similar view showing the parts in a still different position. Fig. 41 is a top plan view of the cam for releasing the ejector-trigger. Fig. 42 is an end view of the trigger. Fig. 43 is an enlarged sectional view taken on the line 43 43 of Fig. 38. Fig. 44 is a detail top plan view of the arm for actuating the ejector. Figs. 45 to 51, inclusive, are detail perspective views illustrating the box in several successive stages during the course of its being covered. Fig. 52 is a perspective view of the plunger-cleaning means and strippers in operative position. Fig. 53 is a detail perspective view of one of the plunger-cleaning brushes and its stripper. Fig. 54 is a detail sectional view of the same.

The frame for supporting the operative parts of the machine may be of any construction suitable for the purpose, and in the present instance is shown as consisting of a table 1, supported on legs 2 and provided at one side with a standard 3, arising vertically from the table. The table 1 midway between its ends is provided with an elevated portion 4, that extends transversely of the table from front to rear thereof and is provided centrally with an aperture 5, (see Fig. 3,) disposed in the path in which the platen, plungers, and boxes travel during the various operations of the machine. Supported by the standard 3 are guides in which travel the plungers which carry the boxes to be covered, and mounted on the table are the covering devices which operate to successively affix the side flaps of the blanks to the sides of the box, turn in the ends of the side flaps against the ends of the box, affix the end flaps to the ends of the box, tuck in the edges of the side and end flaps, and impart a pressure to the sides and ends of the box.

In suitable bearings on the frame of the machine and on the standard 3 is journaled a vertical shaft 6, on the lower end of which is fixed a worm-wheel 7, and mounted in suitable bearings on the frame transversely to the shaft 6 is a driving-shaft 8, on which is fixed a pulley 9, adapted to be driven from any suitable source of power. In practice the shaft 8 is continuously driven. Journaled in alinement with the shaft 8 is a shaft 10, on which is fixed a worm 11, that meshes with the worm-wheel 7. Fixed on the shaft 8 is a disk 12, from the face of which project two pins 13, and splined on the shaft 10 is a similar disk 14, provided with two projecting pins 15 and also provided with a circumferentially-grooved collar 16, which is engaged by a shifting yoke 17. (See Figs. 33 to 37.) The disk 14 is freely movable longitudinally on the shaft 10, but is incapable of rotating independently thereof. Loosely mounted on the shaft 10 between the disks 12 and 14 is an intermediate disk 18, provided on its face next to the disk 12 with an annular groove 19, in which the pins 13 revolve, and provided with two perforations 20, into which project the pins 15. It will be obvious that if the pins 15 be caused to project through the perforations 20 into the groove 19 they will engage the pins 13, and the disks 12 and 14 will then be interlocked and the two shafts 8 and 10 will rotate together; but when the pins 15 are retracted within the perforations 20 they will be out of engagement with the pins 13, and the disks 18 and 14 and the shaft 10 will remain stationary. The clutch is thrown into and out of operation by the following means: The shifting yoke 17 is fixed on one end of a longitudinally-sliding rod 21, mounted in bearings 22, and arranged between one of said bearings and a collar 23 on the rod is a coiled spring 24, which operates to thrust the rod toward the right and lock the clutch members together and thereby cause the worm 11 to rotate and through the medium of the worm-wheel 7 rotate the main shaft 6. On the shaft 6, immediately above the worm-wheel, is mounted one of the three cams C, provided on its under side with a segment-shaped cam-lug 25, one end of which is beveled or inclined, as at 26. (See Fig. 34.) Pivoted to a fixed bearing is a bell-crank lever 27, one end of which carries a cylindrical bearing 28, and the other end is arranged to engage a collar 29, fixed by a set-screw 30 on the rod 21. Slidably arranged in the cylindrical bearing 28 is a bolt 31, which is normally held projected from the bearing by a coiled spring 32, and attached to the inner end of the bearing and spring is a stem 33, carrying at its end a nut 34. Mounted in fixed bearings is a rock-shaft 35, on one end of which is fixed a treadle 36, (see Fig. 2,) and on the other end is fixed a crank-arm 37, the free end of which is forked and straddles the end of the bolt-stem 33. In practice when a box has been completely covered and ejected from the machine the cam C will be in such a position that its cam-lug 25 will engage the bolt 31 and depress it, as most clearly shown in Figs. 33, 34, and 36, and will thus rock the bell-crank 27 about its pivot and move the rod 21 back against the tension of the spring 24, thereby throwing the clutch members out of engagement and automatically stopping the rotation of the shaft 6, which, as will hereinafter be explained, throws the entire machine out of operation. When it is desired to put the machine in operation, the operator depresses the treadle 36, thereby retracting the bolt 31 against the tension of the spring 32 and withdrawing said bolt from beneath the cam-lug 25, immediately upon which the bell-crank lever 27 is released and the spring 24 forces the clutch members together and communicates motion from the shaft 8 to the shafts 10 and 6. A hand-lever 38 is also provided for throwing the machine out of operation. Said lever is pivoted at 39 to a fixed bearing and at its lower end is arranged to engage a collar 40, fixed by a set-screw 41 on the rod 21. It will be obvious that by oscillating said lever in the proper direction the rod 21 will be retracted against the tension of the spring 24 and will separate the clutch members, thus throwing the machine out of operation. It will be obvious that when the treadle is depressed to withdraw the bolt from beneath the cam-lug 25 to start the machine the bell-crank 27 will be rocked about its pivot by the spring 24, and when the treadle is released the spring 32 will project the bolt against the vertical outer face of the cam-lug, in contact with which it will remain until the end of the cam-lug comes opposite the end of the bolt, whereupon the spring 32 will force the bolt out into position to be engaged by the cam-lug again when the cam C has finished another complete revolution or, in other words, when a box has been completely covered and ejected from the machine.

Mounted on the main shaft 6 is a cam C, which actuates the mechanism for operating the lower folding devices, the edge-tuck-in fingers, and the presser-blocks, and the end-turn-in wings are actuated from a cam B, mounted on the shaft 6 above the cam C. Also mounted on the shaft 6 above the cam B is a cam A, which actuates the plungers and strippers, the three cams A, B, and C actuating all the box-covering mechanism.

On the upper end of the standard 3 are bracket-arms 42 and 43, on the former of which are fixed vertical guideways 44, in which is arranged to reciprocate up and down a plunger-rod 45, consisting of a bar rectangular in cross-section and grooved on its opposite sides, as at 46, for the purpose hereinafter made apparent. Fitted in the lower end of the plunger-rod 45 is a tenon 47, (see Figs. 5 and 6,) which is attached by a plate 48 to a rectangular block 49. The block 49 constitutes the lower plunger and in practice is of the same width and length as the box to be covered; but its thickness is less than the depth of the box to be covered. A number of plungers of different sizes are provided and are interchangeable in order that boxes of different sizes may be covered. Superimposed on the plunger 49 is a block 50, constituting the upper plunger, said block being centrally apertured, through which aperture the tenon 47 freely passes, so that the plungers may move independently of one another. Resting in the grooves 46 in the sides of the plunger-rod and passing through the lower end of the latter are two vertical rods 51, which at their lower ends are attached to a metallic block 52, which in turn is detachably secured to the plunger 50. The plunger 50 is the same width and length as the plunger 49, and the combined thicknesses of the two plungers is substantially equal to the depth of the box to be covered. The upper ends of the two rods 51 are connected together by a cross-head 53. Pivoted to the end of the bracket-arm 43 is a lever 54, one end of which is connected to an adjustable link connection 55, which latter in turn is connected to the plunger-rod 45. The link connection forms no part of the present invention and need not therefore be herein described. On the free end of the lever 54 is arranged a weight 56, which serves to counterbalance the weight of the plungers and their connected parts. On the lever 54 between its pivot 37$^a$ and the link connection 55 is a friction-roller 57, which engages an endless cam groove or raceway 58, formed on the periphery of the cylindrical cam A, fixed on the driving-shaft 6. The shape of the cam groove or raceway is shown diagrammatically in Fig. 30, and will be hereinafter referred to.

It will be evident that as the cam A rotates the lever 54 will be oscillated about its pivot and will raise and lower the plunger-rod and its plungers. The guideways 44 are so arranged relatively to the table that as the plungers are raised and lowered they will pass through the aperture 5 in the table.

Fixed to a platform 59 beneath the table is a vertical guide 60, on which is arranged to freely move vertically a rising and falling frame 61. (See Figs. 4 and 29.) Said guide and frame are shown in the present instance as consisting of hollow cylinders; but it is manifest that they may be constructed differently. Fixed to the platform 59 inside the guide 60 is a standard 62, in the upper end of which is journaled a pulley 63, and passing around said pulley is a strap 64, to one end of which is attached a weight 65, the other end of said strap being attached to a plate 66, that is fixed on the lower end of a rod 67. The rod 67 is vertically movable in suitable bearings and is provided at its upper end with a head 68, to which is attached a rectangular platen 69, that is adapted to pass through the aperture 5 in the table. It will be evident that the weight and strap will have the tendency to hold the platen elevated, and its upward movement is limited by the plate or disk 66 on its lower end coming in contact with the under side of the platform 59. In order to cushion the blow of the plate or disk against the platform, I affix to the upper side of the former pads 70, of rubber or other yielding material. When the platen 69 is at the limit of its upward movement, it will rest just above the level of the elevated portion 4 of the table.

Projecting vertically through the plungers 49 and 50 are four stripper-rods 71, each consisting of a round metallic rod. The stripper-rods are connected together in pairs, as shown, one pair being arranged near each end of the plungers. The upper ends of the stripper-rods are bent at right angles to their vertical portions, and the horizontal portion of each of the stripper-rods is cut away or bisected, as at 72, so that said portion is semicircular in cross-section. The bisected portions of each pair of rods overlap each other, as most clearly shown in Figs. 6 and 7, and both pass through a longitudinal perforated block 73. The blocks 73 are also transversely perforated, and through the transverse perforations therein project arms 74, formed or fixed on the ends of a yoke 75. To the yoke are fixed the lower ends of two rods 76, which are movable vertically in perforated lugs 77 on the sides of the guideways 44. To one of the rods 76 is attached one end of a link 78, (see Figs. 1, 5, 19, and 20,) and the other end of said link is pivoted to the end of a bent lever 79, that is pivoted intermediate its ends to the bracket-arm 42. On the opposite end of the bent lever 79 is a friction-roller 80, which engages an endless cam-groove or raceway 81, formed on the periphery of the cam A, said cam-groove being shown diagrammatically in Fig. 30. As the cam A rotates the bent lever is oscillated about its pivot 82 at certain periods of the rotation of said cam and raises and lowers the rods 76 and with them the stripper-rods 71, as will more fully hereinafter appear. As before stated, a number of interchangeable plungers of different sizes are employed for use in connection with boxes of different sizes, and hence it follows that the stripper-rods must be adjusted toward and from each other to fit the different-sized plungers. By mounting the stripper-rods in the blocks 73 in the manner described the rods of each pair may be adjusted toward and from each other by sliding the overlapping ends 72 one upon the other in the block, and they are held in their adjusted positions by a set-screw 83. (See Fig. 6.) The pairs of stripper-rods are also adjusted toward and from each other by moving the blocks 73 on the arms 74. In covering very narrow boxes but a single stripper-rod at each end of the plungers is employed, and in such case the blocks 73 are removed from the arms 74, and blocks 84 are used in their places. (See Fig. 8.) Said blocks 84 are held in place on the rods 74 by set-screws 85, and each of said blocks is provided with a transverse perforation, in which is fitted the horizontal portion of a single stripper-rod 86, which is held in place by a set-screw 87.

Normally the plunger 50 rests on the plunger 49 by gravity and the two plungers move together; but at certain periods of their movements the movement of the upper plunger is arrested, while the lower plunger continues its downward movement, so as to separate the two plungers for the purpose hereinafter explained, and this is accomplished as follows: Attached to the two rods 51 at their upper ends is a laterally-projecting bracket 88, in the end of which is fixed a depending rod 89, carrying at its lower end an approximately wedge-shaped cam 90. (See Figs. 5, 19, and 20.) On the end of the auxiliary bent lever 79 is a rectangular lug or projection 91, which is adapted to engage the bottom of the cam 90 and prevent the further descent of the rods 51, carrying the upper plunger 50, and thus arresting the downward movement of the said plunger, and as the lower plunger continues to descend said plungers are separated and are held separated until the bent lever 79 moves downward and permits the upper plunger to drop down upon the lower plunger. It is desirable, however, for the sake of promptness and certainty that the upper plunger be moved down upon the lower plunger to bring the two together again positively, and this is accomplished by the following means: Pivoted near the end of the bent auxiliary lever 79 is an oscillating arm 92, (see Figs. 5, 19, 20, and 21,) in the upper end of which is formed a cylindrical socket 93, in which is movably fitted a sliding latch 94, having a beveled end 95. Arranged in the socket behind the latch is a coiled spring 96, which operates to thrust forward the latch. To the other end of the arm 92 is attached one end of a coiled spring 97, the opposite end of which is attached to the bent auxiliary lever 79. Said spring is constantly under tension and operates to hold the arm 92 in the position shown in Fig. 5, any suitable stop (not shown) being provided to prevent the spring from oscillating the arm further. When the cam 90 descends to engage the lug 91, its inclined side engages the beveled end of the latch 94 and presses the latter back against the tension of the spring 96 until the cam engages the lug 91, at which time the upper end of the cam has passed beyond the latch and the latter is immediately thrust forward by its spring over the upper end of the cam. When the bent lever 79 is moved downward, the latch forces down the cam, thus forcing down the rods 51 and the upper plunger carried thereby. When the upper plunger and the rods 51 are moved upward, the cam 90 rocks the arm 92 on its pivot, as shown in Fig. 20, and the cam is thus permitted to rise past the latch. When the plungers are at the limit of their upward movement, as shown in Fig. 1, which is the position they are in at the commencement of the operation of the machine, the friction-roller 57 on the lever 54 is in the horizontal portion $a$ of the groove 58 of the cam A, (see Fig. 30,) and the friction-roller 80 on the end of the bent lever 79 is in the horizontal portion $i$ of the cam-groove 81 on the cam A, and as long as said rollers continue in the horizontal portions of their cam-grooves the levers 54 and 79 remain stationary in the position shown in Fig. 1. When the parts are in such position, the stripper-rods 71 are raised relatively to the plungers and are sheathed in the latter, as shown. The plungers are then in position to receive a box to be covered.

The covering to be applied to the boxes is cut into blanks 99 of substantially the shape shown in Fig. 45, and said blanks are pasted on their upper sides. Before placing the box 98 upon the plungers it is placed bottom downward on the body of the blank, as shown in Fig. 46. In practice the bottoms of the boxes are applied to the blanks by an operator and are carried from the latter's bench or table by an endless belt and delivered by the latter to the operator in charge of the covering-machine. The latter operator slips the box, with the cover-blank attached to its bottom, upon the plungers and then depresses the treadle 36, thus putting the shaft 6, with its cams A, B, and C, in motion. When the inclined portion $b$ of the cam-groove 58 on the cam A engages the friction-roller 57 on the lever 54, the latter is forced downward and in turn forces downward the plungers 49 and 50, carrying the box. As the plungers descend they meet the platen 69, and the bottom of the box and the blank are pressed between the lower plunger and the platen, and the blank 99 is thereby firmly affixed to the bottom of the box. As the plungers and box continue to descend they force the platen downward against the action of the strap 64 and weight 65, and the box first encounters the upper covering devices, which operate to affix the side flaps 127 of the blanks to the sides of the box.

Formed on the upper side of the raised portion 4 of the table in front and rear of the aperture 5 are ways 101 and 102, (see Figs. 1 and 4,) between which are movably arranged plates 103. (Most clearly shown in Fig. 26.) One of the ways of each pair, as 101, is undercut, as shown, the side of the other way being vertical, whereby the insertion and removal of the plates in the ways is facilitated. Each of the plates 103 is longitudinally slotted, as at 104, and through said slots pass set-screws 105, which are screwed into the table and operate to hold the plates in the position to which they may be adjusted in the ways. Each of the plates is provided with a depending hanger consisting of two arms 106, united at their lower ends by a cross-bar 107, on which is formed a square socket 108. On the end of the plate adjacent to the aperture 5 is formed or fixed a yoke 109, having its ends bent at right angles toward the aperture 5, as at 110, and perforated, as at 111, to form bearings for a rock-shaft 112. (See Fig. 9.) The rock-shaft projects at its ends through and beyond the ends 110 of the yoke 109, and fixed on each of said ends is an oscillating block 113, provided at its outer edge with two perforated ears 114. Movable endwise in the ears 114 of each of the blocks 113 is a rod 115, provided at its inner end with a U-shaped journal-box 116 and at its opposite end with a nut 117. A coiled spring 118 is coiled about the rod 115 and bears at one end against one of the ears 114 and at its other end against a pin or projection on the rod 115 and operates to thrust the latter and its journal-box toward the aperture 5 in the table. The numeral 119 indicates a covering-roller provided at its opposite ends with journals 120, that are journaled in the journal-boxes 116. About the rock-shaft 112 is coiled a spring 121, one end of which is attached to a collar 122, fixed on said shaft by a set-screw 123, and its other end engages a bolt 124, hereinafter referred to. The rock-shaft is free to turn in its bearings in the ends 110 of the yoke 109 to permit the blocks 113 to oscillate, and thus tilt the rollers or covering devices 119, the spring 121 operating to hold said blocks and rollers normally in the position shown in Fig. 9. It will of course be understood that there are two rollers 119 and their supports provided, the same being arranged in front and rear of the aperture 5 of the table, as most clearly shown in Fig. 3. The rock-shafts 112 are oscillated to tilt the rollers upward by the mechanism presently to be described. Arranged over each of the rollers 119 is a guard-strip 125, consisting of a thin metal plate hinged on one edge and at its ends by hinges 126 to the blocks 113. The rollers 119 project beyond the free edges of said plates, and by hinging the plates in the manner shown they may be lifted up or thrown back to clean the rollers or to facilitate the removal and replacement of the latter.

Plates 103ª, similar in every respect to the plates 103, before described, are adjustably mounted in guideways 101ª and 102ª (see Fig. 3) on the table 1 on opposite sides of the aperture 5, and each of said plates is provided with a depending hanger 106, a yoke 109, blocks 113, journal-boxes 116, rollers 119ª, and guard-strips 125ª and in every other respect provided with all the attachments connected with or carried by the plates 103, before described, the only difference being that the hangers 106 of the plates 103 are longer than those pendent from the plates 103ª in order that the lower ends of all the hangers may lie in the same horizontal plane. As will be readily understood and as is most clearly shown in Fig. 3, the rollers 119ª are arranged at right angles to the rollers 119, and the former lie in a lower horizontal plane than the latter. The function of said rollers is to apply the side flaps 127 and the end flaps 128 of the covering-blanks to the sides and ends, respectively, of the boxes. As the plungers carrying the box and its covering-blank attached to the bottom thereof descend they first pass between the two upper rollers 119, the spring-bearings or journal-boxes of which yield to permit of the passage of the box and plungers between the rollers. As the box and plungers pass between the two upper rollers the latter operate to press the pasted side flaps 127 of the cover-blank against the sides of the box, as shown in Fig. 47. As the box and plungers continue to descend the ends of the flaps 127 are folded in against the ends of the box, as shown in Fig. 48 and by the mechanism hereinafter described, after which the plungers carry the box down between the lower rollers 119ª, which operate to apply the end flaps 128 to the ends of the box, as shown in Fig. 49. Before the flaps 127 and 128 are carried down between the covering devices their tendency is to droop or hang down and curl up at the edges, and their pasted sides are apt to contact with the rollers and apply paste to the latter, so that the rollers in turn would apply paste to the outside of the succeeding boxes, not only defacing the box-cover, but often tearing the blanks. This is prevented by the guard-strips, which overhang the rollers, as shown, whereby the flaps first engage the guard-strips and by the latter are turned upwardly as the box descends, so that the rolls only engage the outer unpasted sides of the flaps. By mounting the rollers in yielding bearings, as described, they yield to permit of the passage of the box therethrough, and the springs 118 cause them to exert a yielding pressure against the covering-blank and also enable them to accommodate themselves to any slight irregularities in the sides of the boxes. By loosening the set-screws 105 the roller-supports may be adjusted toward and from the aperture 5 to adapt the rollers to any sized box.

The mechanism for turning in the ends 130 of the side flaps 127 of the covering-blanks against the ends of the box is as follows: Formed on or attached to the under side of each of the two upper plates 103 are two pairs of perforated lugs or bearings 131, in which are arranged to freely slide two rods 132, (see Figs. 16, 27, and 28,) on the inner ends of which are fixed a bar 133. On the opposite ends of the bar 133 are slidably arranged blocks 134, (see Fig. 17,) which are held in their adjusted positions by set-screws 135. Adjustably arranged in a transverse perforation in each of said blocks is a rod 136, which is held in its adjusted position by a set-screw 137, said rod terminating in a rectangular head 138. Fitted against one of the flat vertical sides of said head is an end-turn-in wing consisting of a flat and substantially rectangular piece of sheet metal 139, provided with a depending slotted tongue 140, which is adjustably secured to the flat face of the head 138 by a headed bolt 141, which passes through the slotted tongue and head and has secured over its threaded end a nut 142, by means of which the wing 139 is held in the position to which it may be set. The wing 139 is bent, as at 143, to form an approximately V-shaped rib or shoulder and is then bent at substantially a right angle, as at 144. It will of course be understood that two wings 139 are provided for each bar 133, the wings being arranged on the opposite ends of said bar and that there are two such bars arranged in front and rear of the aperture 5 in the table and in a plane below the covering-rollers 119. It will also be readily understood that by loosening the set-screws 135 the blocks 134 may be adjusted on the bar to dispose the two wings nearer together or farther apart to suit boxes of different lengths, and that by loosening the set-screws 137 the wings may be adjusted toward and from the bar to accommodate them to boxes of different widths, and, lastly, by means of the bolts 141 and nuts 142 the wings may be adjusted vertically to adapt them to boxes of different heights, the wings being in this manner adjustable to suit boxes of any sizes. The two bars carrying the wings are moved inward or toward each other after the sides of the covering-blank have been affixed to the box by the upper rollers in the manner described, and the ribs or shoulders 143 of the wings engage the ends 130 of the blank and fold them against the ends of the box, as shown in Fig. 48. The means for actuating the wings is constructed as follows, reference being had to Figs. 1, 2, 4, 16, 27, and 28 of the drawings: To each pair of rods is rigidly fastened a bracket-arm 145, provided with a lateral extension 146, as most clearly shown in Fig. 28. Pivoted centrally to a fixed support is a T-shaped lever 147, the horizontal arm 148 of which is provided at its end with a friction-roller 149, that engages a cam-groove 150, formed in the periphery of the cylindrical cam B. The shape of the cam-groove 150 is shown diagrammatically in Fig. 31 and will be hereinafter referred to. To the opposite ends of the vertical portion 151 of the T-lever are pivotally secured the ends of links 152, which at their opposite ends are pivotally secured to the ends of cranks 153, fixed on rock-shafts 154, journaled in suitable bearings on the frame of the table. Fixed on the rock-shafts 154 are cranks 155, having forked ends 156, which loosely engage the extensions 146 of the bracket-arms 145, fixed on the rods 132. It will be apparent that during a certain period of the rotation of the cam B the arm 148 of the T-shaped lever will be depressed, oscillating the said lever about its pivot. As the T-lever oscillates it will through the medium of the links 152 and cranks 153 rock the rock-shafts 154, and the latter will oscillate the cranks 155 toward each other and through their engagement with the bracket-arms 145 will move the wings 139 across the ends of the box and fold in the ends 130 of the covering-blank against the ends of the box. After the ends 130 have been folded in against the ends of the box the lower rollers operate to apply the end flaps 128 to the ends of the box, as shown in Fig. 49 and in the manner before described. The covering-blank will have then been affixed to the bottom, sides, and ends of the box; but the side and end flaps of the blank will project vertically above the upper edges of the box, as shown in Fig. 49, and the mechanism for tucking in and folding down or affixing said upper edges of the flaps to the interior of the box will now be described.

The numeral 157 indicates a bell-crank lever (see Figs. 13 and 22) provided with trunnions 158, through which and bearings 159, formed in the lower ends of the hanger 106, (see Fig. 26,) passes a pin 160. It will be understood that there are four such bell-crank or angle levers, one for each hanger 106, carried by the plates 103. Secured to a shoulder 161 on the end of the horizontal arm 162 of each angle-lever by means of a bolt 163 is a loop 164, which is formed with an upwardly-extending slotted shank 165, which is adjustably secured to said shoulder by the bolt 163, which passes through the slot in the shank and screws into a threaded socket 166 in said shoulder. Projecting radially from the upper end of the rising and falling frame 61 are four horizontal arms 167, which are disposed at right angles to one another (see Fig. 29) and at their ends project loosely through the loops 164. Pivoted to a bracket-arm 168, fixed to the guide 60, is a lever 169, which is provided at one end with a friction-roller 170, that engages a cam-groove 171, formed in the periphery of the cylindrical cam C, said cam-groove being shown diagrammatically in Fig. 32, and at its other end said lever is forked, as at 172, and embraces the rising and falling frame 61. The ends of the forked portion 172 of the lever are slotted, as at 173, and through said slots project pins 174, fixed in the opposite sides of the rising and falling frame. It will be obvious that as the cam C revolves the lever 169 will be oscillated at certain periods of the revolution of the cam and will raise and lower the frame 61 and through the medium of the arms 167 and loops 164 will rock the bell-crank or angle lever 157 simultaneously about their pivots 160. Fitted in the sockets 108, carried by the hangers 106 and vertically adjustable therein, are pillars or standards 175, (see Fig. 13,) said pillars being held in their adjusted positions by set-screws 176. Formed on the upper end of each of the pillars 175 is a transverse bracket 177, and fitted in the upper end of the pillar and bracket and at a right angle to the latter is a hollow cylinder or barrel 178. (See Figs. 13, 14, 15, and 24.) The bracket is bent up vertically at its opposite ends, as at 179, and is perforated, as at 180, to form bearings. Bracket-arms 181 extend horizontally rearward or outward from the bent-up ends 179 of the bracket and at their extremities are provided with depending lugs 182, which are perforated, as at 183. Corresponding perforations 184 are formed in the ends of the bracket and in alinement with the perforations 183. Horizontal and laterally-projecting extensions 185 are formed on the ends of the bracket-arms 181 and rest against the edges of the hanger 106 and operate to brace and render the bracket rigid. Movably arranged in the perforations 183 and 184 are two rods 186, which are fixed at their forward or inner ends in a bar 187, having a longitudinal groove 188 in its front or inner face, and in said groove is fitted a presser-block 189. The presser-block has fixed to its rear side a wear plate or plates 190. Adjusting-screws 191 are screwed through the ends of the bar 187 and bear against the wear-plates 190. By turning said screws in the proper direction the presser-block may be projected out of the groove in the bar in an obvious manner to adjust the presser-block relatively to the plungers. Coiled springs 192 are coiled about the rods 186 and bear at one end against the ends of the bracket 177 and at the other ends bear against pins or projections on the rods. Said springs operate to thrust the rods and the presser-block carried thereby outward or rearward or, in other words, operate to retract the presser-block away from the aperture 5 and out of the path of the plunger. In the barrel 178 is slidably fitted a bolt 193, which is arranged to engage the lower edge of the bar 187, carrying the presser-block, the rear face of said bar being recessed, as at 194, (see Fig. 23,) to permit the bar to pass over the end of the barrel. The bolt 193 is provided with a reduced extension or stem 195, the end of which fits loosely in a socket 196, formed centrally in the end of a thrust-pin 197, slidably arranged in the rear end of the barrel, and a coiled spring 198 is disposed in said barrel between the adjacent ends of the bolt 193 and thrust-pin 197. The outer end of the thrust-pin is arranged to engage the forward side of the vertical arm 199 of the angle-lever, said arm being preferably recessed, as at 200, for the reception of said thrust-pin. On the rear side of the bar 187 is formed a cam projection 201, and journaled in the bearings 180 in the bent ends of the bracket 177 is a rock-shaft 202, on which is fixed a cam 203, which is adapted to engage the cam projection 201 and thrust the bar 187 and the presser-block carried thereby forward or inward. Fixed on a projecting end of the rock-shaft 202 is a crank 204, to which is pivoted the upper end of a link 205, the lower end of which is slotted, as at 206, and is adjustably pivoted to the end of the horizontal arm 162 of the angle-lever by a bolt 207.

The numeral 208 indicates one of the tuck-in fingers, consisting of a flat bar of the same length as the presser-block. Said tuck-in finger is clamped centrally in the forked end of an arm 209, which at its rear end is formed with a square loop or eye 210, that is detachably fitted on the upper end of the vertical arm 199 of the angle-lever and is fixed in place thereon by a set-screw 211.

Referring to Figs. 4, 5, and 13, the numeral 212 indicates a link which is slotted at its lower end and is adjustably secured to one side of the horizontal arm 162 of the angle-lever by a set-screw 213 and at its upper end is pivotally connected to one end of a crank 214, the other end of which latter is fixed on the rock-shaft 112, journaled in the yoke 109. As before described, there are two pairs of the plates 103, each provided with a pendent hanger 106, and hence there are four presser-blocks and tuck-in fingers, one on each side of the aperture 5, and their connected mechanisms. The operation of this part of the invention is as follows: After the plungers and the box have passed down between the lower pair of covering devices or rollers 119$^a$ the side and end flaps of the covering-blank will be folded up against and affixed to the sides and ends of the box, as shown in Fig. 49. The plungers continue to descend with the box, and just before the plungers arrive opposite the presser-blocks and tuck-in fingers the descent of the upper plunger is arrested by the cam 90 coming in contact with and resting on the lug 91 on the end of the auxiliary lever 79, as before described, and as the lower plunger continues to descend for a brief period longer and then comes to a state of rest, as will hereinafter be described, the two plungers are slightly separated, the lower and greater portion of the box then lying opposite or between the presser-blocks. The cam-groove in the cam C then operates to depress the friction-roller 170 and raise the frame 61, which through the medium of the radial arms 167 simultaneously rocks all four of the angle-levers 157. During the initial part of this rocking motion of the angle-levers the vertical arms 199 force the thrust-pins inward in the barrels 178 and through the medium of the coiled springs 198 eject the bolts 193, which engage the lower edges of the bars 187 and force the presser-blocks against the lower portions of the sides and ends of the box. This pressure holds the sides and ends of the box squarely and flatly against the sides and ends of the lower plunger 49, while the tuck-in fingers are tucking in the edges of the covering-blank which project above the upper edges of the box. Upon the continued rocking movement of the angle-levers, during which the presser-blocks remain pressed against the sides and ends of the box, the coiled springs 198 yielding to permit of the forward movement of the arms 199, the tuck-in fingers 208 engage the edges of the covering-blank and tuck them in over the upper edges of the box and between the upper and lower plungers 49 and 50, as shown in Fig. 50.

After the tuck-in fingers have tucked in the edges of the covering-blank and before said fingers are retracted from between the two plungers the cam-groove 81 in the cam A operates to raise the friction-roller 80 and force down the lug 91 on the end of the bent or auxiliary lever 79, and the latch 94 operates to force down the cam 90 and through the connected parts described forces down the upper plunger 50 onto the tuck-in fingers, thereby preventing the edges or flaps of the covering-paper from curling back, as is their natural tendency, when the tuck-in fingers recede. The cam C then operates to lower the rising and falling frame 61 and simultaneously oscillates the angle-levers in a direction the reverse of that before described. During the initial portion of such reverse movement of the angle-levers the pillars 199 operate to withdraw or retract the tuck-in fingers from between the plungers and remove the pressure from the coiled springs 198, whereupon the coiled springs 192 operate to retract the presser-blocks 189 and remove the pressure from the sides and ends of the box. When the tuck-in fingers are retracted from between the two plungers, the upper plunger 50 drops down within the box onto the lower plunger and folds down the previously-tucked-in edges of the covering-blank against the interior of the sides and ends of the box, as shown in Fig. 51. The lower plunger is then moved downward a slight distance by the lever 54 and cam A and then comes to a state of rest, whereupon the reverse movement of the angle-levers continuing the links 205 and cranks 204 rock the shafts carrying the cams 203 and cause the latter to engage the cam projections 201 and thrust the presser-blocks against the sides and ends of the box and firmly affix the folded-in edges of the covering-blank to the interior of the box and square the upper portion of the box. When the cams 203 sweep over and above the cam projections 201, the presser-blocks are retracted by the coiled springs 192 and the pressure is removed from the box. As the rising and falling frame 61 approaches the limit of its downward movement the set-screws 213 reach the ends of the slots in the lower ends of the links 212 and draw down the latter and through the medium of the cranks 214 (see Fig. 9) rock the rock-shafts 112 and tilt the covering-rollers 119 and 119ª upward and backward away from the aperture 5 and out of the path of the plungers. The box is now completely covered and it only remains to strip the box from the plungers and discharge it from the machine. The cam A now operates to raise the plungers up between the presser and edge-tuck-in devices and between the covering devices or rollers and through the aperture 5, and at the same time the cam A also operates to oscillate the bent or auxiliary lever in a direction to thrust down the rods 76 and the stripper-rods 71 actuated thereby. This reverse movement of the plungers and stripper-rods operates to separate the cam 90 and the latch 94, whereupon the pivoted arm 92 is rocked upon its pivot by the reverse movements of said arm and latch in the manner shown in Fig. 20 and permits the cam to ascend with the plungers and the arm 92 to descend with the auxiliary lever. As the plungers ascend and pass through the perforations in the plungers and by the time the platen 69 has reached the limit of its upward movement the stripper-rods will have engaged the bottom of the box and will hold the latter on the platen. The plungers, however, continue to ascend and are raised out of the box, or, in other words, the box is stripped off the plungers and left resting on the platen. After the plungers have been withdrawn from the box and are returning to the limit of their upward movement, or to the starting-point, the cam A operates to depress the friction-roller 80, and thereby raise the stripper-rods, so that when the plungers have been raised to the limit of their upward movement the stripper-rods will be sheathed in the plungers, as shown in Fig. 1. While the plungers and stripper-rods are returning to the starting-point an ejector is put into action and ejects the finished box from the platen and knocks it to one side, whereupon the machine is in readiness to receive and cover another box.

The ejector is constructed as follows, reference being had to Figs. 1, 38, 39, 40, 41, 42, 43, and 44: Referring to said figures, the numeral 215 indicates a frame attached to the standard 3 and provided with four perforated lugs, respectively indicated by the numerals 216, 217, 218, and 219 and constituting bearings for two horizontal and parallel rods 220 and 221, which are longitudinally movable therein. On the inner end of the rod 220 or that end of said rod adjacent to the aperture 5 in the table is a buffer 222, which may be formed of or covered with elastic or other suitable material. The lug 218 is elongated or extended downward to form a support for a trigger 223, consisting of a flap-lever pivoted intermediate its ends to the face of the lug 218 by a machine-screw 224, about which it is free to oscillate, and the upper edge of said lever is held in engagement with the rod 220 by a spring 225, which is fixed at one end to the side of the lug 218 by a screw 226 and at its other end bears against the edge of the upper portion of the trigger. Adjustably fixed on the rod 221 by a set-screw 227 is a collar 228, to the upper end of which is fixed a beveled cam 229, that is adapted to engage the edge of the tail or lower end of the trigger and oscillate the latter about its pivot in a direction to move the upper end of the latter away from the rod 220. Adjustably secured on the rod 220 by a set-screw 230 is a collar 231, and fixed on the rod 221 is a collar 232, from which arises a vertical rigid arm 233, that is forked at its upper end and straddles the rod 220. A coiled spring 234 is disposed on the rod 220 between the collar 231 and the forked end of the arm 233. A coiled spring 235 is secured at one end to an eye 236, formed on the collar 232, and at its other end to an eye 237, formed on the lug 217. Formed in the rod 220 is a longitudinal groove 238, in which is movable endwise an adjustable stop consisting of a strip or short bar 239, rectangular in cross-section and projecting beyond the periphery of the rod, as most clearly shown in Fig. 43. The stop 239 is slotted longitudinally, as at 240, and is adjustably held to its seat in the groove 238 by a screw 241. A slot 242 (shown by dotted lines in Fig. 42) is formed in the lug 218 for the passage therethrough of the stop. On the main shaft 6 is fixed a horizontal arm 243, Fig. 44, which during a certain period of the revolution of said shaft is arranged to engage the collar 228, carrying the cam 229, and move it toward the trigger.

The operation of the ejector is as follows: The frame of the ejector is fixed to the standard 3 at such a point that the ejector-rod 220, carrying the buffer 223, lies in a horizontal plane which is just above the plane of the top of the platen 69 when the latter is at the limit of its upward movement. The arm 243 is fixed on the main shaft 6 in such manner relatively to the cams A, B, and C that as the box is being stripped from the plunger in the manner described the arm 243 engages the collar 228, and as said arm is carried around with the shaft 6 it moves the collar 228 and with it the cam 229 and rod 221 in the direction of the arrow in Fig. 38, or toward the trigger. The collar 232 being fixed on the rod 221 moves with the latter and, through the medium of the arm 233, moves the spring 234 in the direction of the arrow also. As the spring bears against the collar 231, fixed on the shaft 220, the latter is likewise moved in the direction of the arrow. As the collar 232 moves forward with the rod 221 the spring 235 is stretched or placed under tension. As the arm 243 continues to move the said parts in the direction described the stop 239 engages the upper end of the trigger 223, as shown in Fig. 39, thereby arresting the movement of the rod 220, and the continued forward movement of the other parts compresses the spring 234, as shown in Fig. 40. By the time the spring 234 has been fully compressed the beveled edge of the cam 229 engages the tail of the trigger and oscillates the latter about its pivot, thereby moving the upper end of the trigger away from the rod 220 and from in front of the stop 239, whereby the spring 234 immediately shoots forward the ejector-rod 220 and its buffer 222, and the latter strikes the end of the box and ejects it from off the platen. When this has occurred, the end of the arm 243 sweeps from off the collar 228, whereupon the spring 235 contracts and retracts the parts to the position shown in Fig. 38.

Having described in detail the operations of the different operating mechanisms separately, it now remains to describe the operation of the organized machine as a whole. The box, with the covering-blank attached to the bottom thereof, having been placed on the plungers the operator depresses the treadle 36, and thereby starts the main shaft 6 rotating. At this time the friction-rollers 80, 57, 149, and 170 are in the horizontal portions $i\,a\,r\,v$, respectively, of their cam-grooves 81, 58, 150, and 171 of the cams A, B, and C. (See Figs. 30, 31, and 32.) When the downwardly-inclined portion $b$ of the cam-groove 58 engages the friction-roller 57, the lever 54 is oscillated about its pivot and forces the plungers downward rapidly. Then the less steeply or abruptly inclined portion $b'$ engages the friction-roller 57 and oscillates the lever 54 at a slower rate of speed and forces the plungers, platen, and the box down between and below the first pair of covering devices, which operate to affix the side flaps of the covering-blank to the sides of the box. By first giving a rapid downward movement to the plungers the box is not given time to drop off the plungers before being lowered onto the platen, and the plungers are caused to descend very rapidly while performing no work. The friction-roller 57 is then engaged by the horizontal portion $c$ of the cam-groove 58, and the movement of the plungers is arrested. At this point of the operation of the machine the friction-roller 149 on the T-lever 147 is engaged by the downwardly-inclined portion $s$ of the cam-groove 150 on the cam B, and said lever is oscillated and through the medium of the connections described actuates the end-turn-in wings and causes the latter to fold in the ends of the side flaps of the blank against the ends of the box. The friction-roller 149 then enters the horizontal portion $t$ of the cam-groove 150, which throws the end-turn-in wings out of action and leaves them embracing the ends of the box. The roller 57 then enters the downwardly-inclined portion $d$ of the cam-groove 58, which moves the plungers down farther and carries the boxes down between and through the lower pair of covering devices, which operate to fold the end flaps against the ends of the box, after which the friction-roller 57 enters the horizontal portion $e$ of its cam-groove, and the plungers are again brought to a state of rest. Just before the roller 57 enters the horizontal portion $e$ of the cam-groove 58 the cam 90 is seated on the projection 91 on the end of the auxiliary lever 79 and arrests the downward movement of the upper plunger 50. The lower plunger 49, however, continues to descend for a brief period longer, or until the roller 57 enters the horizontal portion $e$ of the cam-groove, when its downward motion is also arrested. This causes a slight separation of the two plungers. While the two plungers are being separated the friction-roller 149 enters the upwardly-inclined portion $u$ of the cam-groove 150 and oscillates the T-lever 147 in a reverse direction to that before described and retracts the end-turn-in wings to their former or normal positions. The plungers are now stationary, and the lower plunger and the lower part of the box lie between the presser-blocks 189, while the friction-roller 170 has entered the downwardly-inclined portion $w$ of the cam-groove 171 in the cam C, thereby oscillating the lever 169 and raising the frame 61. This through the medium of the connections before described rocks the vertical arms 199 of the angle-levers 157 forward and forces the presser-blocks 189 against the sides and ends of the box and holds them perfectly square and flat against the lower plunger. On the continued forward movement of the arms 199 of the angle-levers the edge-tuck-in fingers 208 move inward and engage the upper edges of the covering-blank which project vertically above the box and fold them horizontally over the upper edges of the box. During this movement the presser-blocks continue to press against the sides and ends of the box, the coiled springs 198 yielding to permit the continued forward movement of the arms 199 of the angle-levers to thrust inward the edge-tuck-in fingers. While the edge-tuck-in fingers are turning in the edges of the covering-blank the friction-roller 80 has entered the short upwardly-inclined portion $j$ of the cam-groove 81 and forces down the bent end of the auxiliary lever 79 a short distance, thereby moving the upper plunger 50 down to the edge-tuck-in fingers, and the roller 80 then enters the short horizontal portion $k$ of the cam-groove 81 and brings the upper plunger again to a state of rest. At this point the roller 170 enters the short and abruptly upwardly-inclined portion $x$ of the cam-groove 171 and lowers the frame 61 a short distance, thereby retracting the edge-tuck-in fingers from between the plungers, and permits the coiled springs 192 to retract the presser-blocks. The roller 170 then enters the horizontal portion $y$ of said cam-groove 171 and holds the presser-blocks and edge-tuck-in fingers in their retracted positions. The roller 80 now enters the upwardly-inclined portion $l$ of the cam-groove 81 and again forces down the bent end of the auxiliary lever 79, which causes the latch 94 to force down the cam 90 and thrust down the upper plunger into the box and onto the lower plunger. This movement of the upper plunger folds the previously-tucked-in edges of the covering-blank into the interior of the box. The roller 57 then enters the short downwardly-inclined portion $f$ of the cam-groove 59, and as the roller 80 is still in engagement with the upwardly-inclined portion $l$ of its cam-groove 81 both plungers move downward a slight distance to bring the upper part of the box between the presser-blocks 189, after which said rollers respectively enter the horizontal portions $m$ and $g$ of their cam-grooves and the plungers are once more brought to a state of rest. At this period of the operation of the machine the roller 170 has entered the upwardly-inclined portion $z$ of its cam-groove 171, thereby lowering the frame 61 and rocking downward the horizontal arms 162 of the angle-levers. This movement of said arms through the medium of the links 205 and cranks 204 rocks the shafts 202 and turns the cams 203 upward, and said cams as they rub past and in engagement with the cam ribs or projections 201 thrust the presser-blocks 189 forward and give to the upper part of the box a final pressure, thus firmly pressing the tucked-in and folded-down edges of the covering-blank against the interior of the box, thereby effectually affixing said edges to the inner sides and ends of the box and squaring and shaping the latter. The roller 170 still being in engagement with the upwardly-inclined portion $z$ of its cam-groove, the angle-levers continue to turn in the direction described, and when the screws 213 reach the lower ends of the slots in the ends of the links 212 they draw said links downward, and the latter then through the medium of the cranks 214 (see Fig. 9) rock the shafts 112 and tilt or tip the rollers 119 upward and out of the path of the plungers. The roller 57 now enters the upwardly-inclined portion $h$ of its cam-groove 58, and at the same time the roller 80 enters the upwardly-inclined portion $n$ of its cam-groove 81, and thereupon the plungers commence to ascend and the bent end of the auxiliary lever 79 is forced down and through the medium of the link 78 causes the stripper-rods 71 to descend. The moment this ascending movement of the plungers and descending movement of the stripper-rods commences the cam 90, pressing upward against the latch 94, swings the arm 92 to one side, as shown in Fig. 20, and releases the latch from its engagement with the cam to enable the plungers and stripper-rods to continue their reverse movements. The two plungers continue to ascend, the upper plunger being carried upward by the lower plunger, and the stripper-rods continue to descend until they have passed through the perforations in the plungers and engage the bottom of the box resting on the platen 69. This occurs when the platen reaches the limit of its upward movement. The roller 80 at this moment enters the horizontal portion $o$ of its cam-groove 81 and the stripper-rods are held stationary against the bottom of the box as the latter rests on the platen; but the plungers continue to ascend and are withdrawn from the box. The roller 80 then enters the downwardly-inclined portion $p$ of its cam-groove, and the strippers thereupon commence to ascend. While the stripper-rods are still ascending the roller 57 enters the horizontal portion $a$ of its cam-groove and the plungers come to a state of rest at the limit of their upward movement and in their original position, and the stripper-rods continue to ascend until the roller 80 enters the horizontal portion $i$ of its groove, upon which the stripper-rods will also be brought to a state of rest in their original position and sheathed in the plungers, as shown in Fig. 1. As the stripper-rods are being withdrawn from the box the arm 243 on the main shaft 6 engages the collar 228, carrying the cam 229 of the ejector (see Figs. 38 to 44) and moves said cam forward toward the trigger 223, at the same time moving forward the ejector-rod and compressing the spring 234. Just after the stripper-rods have been entirely withdrawn from the box, leaving the latter resting on the platen, and while they are returning to their original position the cam 229 engages and oscillates the trigger, thereby releasing the ejector-rod 220, which immediately shoots forward, and the buffer 222 strikes the box and ejects it from the platen to one side of the machine. The spring 235 then operates to return the parts of the ejector to their normal positions in the manner before described.

In some instances it is desirable to dispense with the edge-turn-in mechanism. For example, when a relatively small number of boxes are to be covered it is more convenient and cheaper to turn the edges in by hand than it is to make plungers and tuck-in fingers to fit the boxes to be covered and to take the time and trouble to adjust the edge-turn-in mechanism to suit the particular-sized boxes. In such case it is merely necessary to remove the arms 209, carrying the edge-tuck-in fingers, from the vertical arms 199 of the angle-levers. The machine will not operate then to tuck in and fold down the edges of the covering-blanks into the interior of the boxes, and this is then done by hand after the boxes have been ejected from the machine. It is also advantageous to make the arms 209 removable from the vertical arms 199 of the angle-levers in order that the tuck-in fingers may be taken out, cleaned, and replaced, and for the further reason that it is easier to take off said arms with the fingers than to take the fingers out of the arms and replace them with others when adjusting the machine to suit boxes of a different size. Moreover, if any portion of the edge-tuck-in mechanism should be broken or become deranged the arms carrying the fingers can be instantly removed and the machine continue to cover the boxes without turning in the edges while the edge-turn-in mechanism is being repaired. It is also desirable at times to lock the covering-roller supports in such manner that they have no tilting or tipping movement—for example, when the presser-blocks fail to give sufficient pressure to thoroughly affix the tucked-in and folded-down edges of the covering-blanks to the interior of the boxes, especially when extra heavy covering-paper is used to cover the boxes, which has an inherent tendency to spring away from the sides and ends of the box, also in the event of one of the presser-bars failing to act on account of breakage or other cause. In any of the events enumerated the presser-rolls are prevented from tilting or tipping by the means presently to be described, so that they will operate to give a second pressure to the sides and ends of the boxes on the upward stroke of the plungers. This is accomplished in the following manner, reference being had to Figs. 9 to 12: The bolt 124, carried by the end 110 of the yoke 109, is movable longitudinally therein and is held in its adjusted position by a pin 244, which passes through the bearing-block and engages either one of two perforations 246, formed in the bolt. Said bolt at its outer end projects into a vertical slot 245, formed in the inner end of the bearing-block 113, when the bolt is in the position shown in Fig. 12, and in such case the bearing-block is free to rock with the rock-shaft 112 to tilt or tip the roller 119. When it is desired to prevent the roller from tilting or tipping, however, the link 212 is disconnected and the bolt is moved endwise into a socket 247, formed in the bearing-block, and is held in place therein by inserting the pin 244 in the proper hole 246 in the bolt. The bearing-block, and with it the roller, is thus rigidly locked against any tilting or tipping movement.

In the annexed drawings and in the detailed description of the various parts of the machine I have illustrated and described the means for affixing the side and end flaps of the covering-blank to the sides and ends of the box as comprising rollers; but I do not wish to be understood as limiting myself strictly to rollers, for it will be obvious that other pressure means may be employed for this purpose, and I have therefore used the term "covering devices," which term is employed in a broad sense to include rollers or other equivalent means. I have also shown and described the covering devices or rollers as "tilting upward;" but I do not wish to be understood as limiting myself specifically to such movement, for it will be obvious that they may be moved in some other manner in order to bring them out of the path of movement of the plunger, and I therefore use the term "movable" in its broad sense to include a tilting or other movement.

It will be apparent that various changes or modifications may be made to the machine and will readily suggest themselves to any one making and using the same, and I do not, therefore, restrict myself to the specific constructions, combinations, and arrangements of parts herein shown and described, but reserve to myself all equivalents thereof as might come within the terms of the claims following this specification.

In Fig. 52 of the drawings I have illustrated means for stripping the box from the plungers. When such means are employed, the stripper-rods 71, before referred to, are dispensed with, and in such case instead of the yoke 75, before described, an endless yoke 247 is employed, said yoke being secured to the lower ends of the rods 76, as before.

Projecting horizontally from the sides and ends of said yoke are rods or arms 248, on each of which is adjustably secured by a set-screw 249 a block 250, and secured in said block is a bell-crank-shaped rod 251, on the lower depending end of which is adjustably fixed by a set-screw 252 a block 253. The block 253 is fastened centrally to a brush-back 254, provided on its inner face with a brush or bristles 255 and having rigidly attached to its lower edge a horizontal sheet-metal blade or wing 256, the inner or free edge of which lies in substantially the same vertical plane with the free ends of the brush-bristles. The blades or wings 256 are provided with transverse slots $256^a$ and are attached to the brush-backs by screws $256^c$, that pass through said slots. By loosening the screws the blades or wings may be adjusted on the brush-backs in an obvious manner. It will of course be understood that four such brushes are provided, said brushes being arranged to lie in close proximity to the sides and ends of the plungers. The brushes and stripper-blades are actuated by the rods 76, link 78, and auxiliary or bent lever 79 in precisely the same manner as the stripper-rods 71, before described, and when the platen 69 reaches the limit of its upward movement the brushes 255 and stripper-blades 256 descend about the box, and the inner edges of the stripper-blades engage the upper edges of the box and hold the latter stationary on the platen. As the plungers ascend they are withdrawn from the box and pass between the brushes, which operate to brush off the sides and ends of the plungers and effectually remove any paste therefrom that may have adhered to the plungers. The latter are thus kept perfectly clean at all times and have no tendency to smear the interior of the box or the edges of the blanks folded therein. After the plungers have been withdrawn from the box the brushes and stripper-blades are raised to the limit of their upward movement in precisely the same manner as the stripper-rods 71 before described. The brushes and stripper-blades immediately above described are preferably employed instead of the stripper-rods 71, and the stripper-blades need only be two in number, and in such case are fixed to the backs of the brushes disposed at the ends of the plungers.

When covering boxes of certain sizes and when using covering-blanks of certain kinds of paper, the side and end flaps under the influence of the paste applied thereto are apt to droop down and curl inward and under, and when this occurs they are apt to either fail to be fairly engaged by the covering devices or to smear the latter with paste. To avoid such a result, I provide the following means, reference being had to Fig. 4 of the drawings: To each of the upper pair of yokes 109, carrying the supports for the covering devices, is secured a resilient horizontal guard strip or plate 257, which projects horizontally above the adjacent covering roller or device. Said guard-strips operate as temporary supports for the end flaps of the blank and cause them to be fairly and properly engaged by the covering devices as the box descends between them. By forming them of resilient material they are capable of yielding upward should the covering-rollers engage them when said rollers are tilted upward to move out of the path of the ascending plungers. Furthermore, during the operation of covering the first few boxes after the machine has been adjusted to suit the particular size of the boxes to be covered it is desirable that the ejector be rendered inoperative, so that the said first few boxes will remain on the platen, whereby they may be removed by the operator for convenient examination to determine whether the machine has been properly adjusted to neatly and accurately cover the boxes. This is accomplished by the means shown in Fig. 44 of the drawings. Instead of constructing the arm 243 in such manner as to engage and actuate the cam 229 once during every complete revolution of said arm, and thereby operate the ejector mechanism, I prefer to provide said arm with a jointed extension 258, (see Fig. 44,) which is beveled at its inner end and is pivoted, as at 259, to the end of the arm 243. The arm 243 is provided with a beveled shoulder 260, which when the pivoted extension is in alinement with the arm 243 is engaged by the beveled end 261 of said extension, and the latter is held in alinement with or forms a prolongation of the arm, so as to engage the cam 229 and actuate the ejector in the manner hereinbefore described. When it is desired, however, to cause the arm 243 to fail to actuate the ejector, the pivoted extension 258 is turned on its pivot at a right angle to said arm, whereby when the arm revolves past the cam 229 the said extension will be unable to engage the cam, and hence will fail to actuate the ejector. While I have shown and described the arm 243 as being provided with a pivoted extension, I do not wish to be understood as limiting myself to such particular construction, as it will be obvious that the extension may be made in various other ways to accomplish the same result.

What I claim, and desire to secure by Letters Patent, is—

1. In a box-covering machine, the combination with means for supporting the box to be covered, of covering devices, means for imparting a relative movement between said supporting means and covering devices, and means for moving the covering devices out of operative position during a part of said relative movement between the supporting means and covering devices.

2. In a box-covering machine, the combination with means for supporting the box to be covered, of covering devices, means for causing said box-supporting means to move back and forth between the covering devices, and means for moving the covering devices out of the path of movement of the box-support during one stroke of the latter.

3. In a box-covering machine, the combination with means for supporting the box to be covered, of covering-rollers for pressing the covering material to the sides and ends of the box, means for imparting a relative movement between said box-support and covering-rollers, and means for moving the covering-rollers out of operative position during a part of said relative movement between the supporting means and covering-rollers.

4. In a box-covering machine, the combination with a vertically-reciprocating plunger adapted to support and carry the box to be covered, of covering devices, means for causing said plunger to move back and forth between the covering devices, and means for moving the covering devices out of the path of movement of the plunger during the upstroke of the latter.

5. In a box-covering machine, the combination with a vertically-reciprocating plunger adapted to support and carry the box to be covered, of covering-rollers, means for causing said plunger to move back and forth between said covering-rollers, and means for moving the covering-rollers out of the path of movement of the plunger during the upstroke of the latter.

6. In a box-covering machine, the combination with a reciprocating plunger adapted to support and carry the box to be covered, of pivotally-mounted covering-rollers, means for causing the plunger to travel between said rollers, and means for tilting the rollers out of the path of movement of the plunger during one stroke of the latter.

7. In a box-covering machine, the combination with a vertically-reciprocating plunger adapted to support and carry the box to be covered, of upwardly-tilting covering-rollers, means for causing the plunger to travel between said rollers, and means for causing said rollers to move up and out of the path of movement of the plunger during the return stroke of the latter.

8. In a box-covering machine, the combination with a reciprocating plunger adapted to support and carry the box to be covered, of two pairs of covering devices, means for causing the plunger to move between said covering devices, and means for simultaneously moving all of said covering devices out of the path of movement of the plunger during the upstroke of the latter.

9. In a box-covering machine, the combination with movable covering devices for folding the covering material up against the sides and ends of a box, of angle-levers operatively connected to said covering devices, and means for rocking said angle-levers whereby said covering devices are moved out of operative position.

10. In a box-covering machine, the combination with movable covering-rollers for folding the covering material up against the sides and ends of a box, of angle-levers operatively connected to said covering devices, and means for rocking said angle-levers whereby said covering-rollers are moved out of operative position.

11. In a box-covering machine, the combination with tilting covering devices, of angle-levers operatively connected to said covering devices, and means for rocking said angle-levers to move the covering devices out of operative position.

12. In a box-covering machine, the combination with covering devices, of pivoted supports therefor, and means operatively connected to said pivoted supports whereby they are tilted to move the covering devices out of operative position.

13. In a box-covering machine, the combination with covering-rollers, of pivoted supports therefor, and means operatively connected to said supports whereby they are tilted to move the covering-rollers out of operative position.

14. In a box-covering machine, the combination with covering devices, of movable supports therefor, and means operatively connected to said supports and acting to move them together with the covering devices, out of operative position.

15. In a box-covering machine, the combination with covering devices, of movable supports therefor, angle-levers operatively connected to said movable supports, and means for rocking said angle-levers whereby the supports are moved and the covering devices shifted out of operative position.

16. In a box-covering machine, the combination with covering devices, of pivoted supports therefor, angle-levers operatively connected to said pivoted supports, and means for rocking said angle-levers whereby the supports are tilted and the covering devices moved out of operative position.

17. In a box-covering machine, the combination with covering-rollers, of pivoted supports therefor, angle-levers operatively connected to said supports, and means for rocking said angle-levers whereby the supports are tilted and the covering-rollers moved out of operative position.

18. In a box-covering machine, the combination with a forked bracket, of a rod journaled therein, blocks fixed to the opposite ends of said rod, a covering device supported by said blocks, and means for rocking said rod whereby the covering device is moved out of operative position.

19. In a box-covering machine, the combination with a forked bracket, of a rod journaled therein, blocks fixed to the opposite ends of said rod, a covering device yieldingly mounted in said blocks, and means for rocking said rod whereby the covering device is moved out of operative position.

20. In a box-covering machine, the combination with an adjustable bracket, of a rod journaled therein, blocks fixed to the opposite ends of said rod, a covering device supported by said blocks, and means for rocking said rod whereby the covering device is moved out of operative position.

21. In a box-covering machine, the combination with means for supporting and carrying the box to be covered, of covering devices coöperating with said box supporting and carrying means and operating to affix the covering material to the sides and ends of the box, said covering devices including the end-turn-in wings, and edge-tuck-in fingers, and a rising and falling frame operatively connected to said edge-tuck-in fingers.

22. In a box-covering machine, the combination with a reciprocating plunger adapted to support and carry the box to be covered, of covering devices coöperating with the plunger and including end-turn-in wings and edge-tuck-in devices, and a rising and falling frame operatively connected to said edge-tuck-in devices.

23. In a box-covering machine, the combination with means for tucking the covering material over the edge of the box, of a vertically-reciprocatory frame located below and operatively connected to said edge-tucking means, and means for reciprocating said frame to positively advance and retract said edge-tucking means.

24. In a box-covering machine, the combination with a plurality of devices for tucking the covering material over the sides and ends of a box, of a rising and falling frame located below and operatively connected to said edge-tucking devices and operating to move said devices simultaneously, and means for moving said rising and falling frame to positively advance and retract said edge-tucking devices.

25. In a box-covering machine, the combination with means for tucking the covering material over the edge of the box, of a vertically-reciprocating frame having radial arms operatively connected to said edge-tucking means, and means for reciprocating said frame to actuate the edge-tucking means.

26. In a box-covering machine, the combination with means for tucking the covering material over the edge of the box, of a vertically-reciprocating frame located below and having a plurality of radial arms operatively connected to said edge-tucking means, and means for reciprocating said frame vertically to positively advance and retract said edge-tucking means.

27. In a box-covering machine, the combination with means for affixing the covering material to the sides and ends of the box, of means for tucking the covering material over the edge of the box, means acting upon the outside of the box to hold the sides and ends thereof square during the operation of the edge-tuck-in means, and means for imparting a pressure to all sides of the box after the tuck-in means have acted.

28. In a box-covering machine, the combination with means for affixing the covering material to the sides and ends of a box, and means for imparting a pressure to all sides of the box on the outside thereof after the cover-affixing means have acted.

29. In a box-covering machine, the combination with means for affixing the covering material to the sides and ends of a box, means for imparting a pressure to all sides of the lower portion of the box during the operation of the cover-affixing means, means for folding in the covering material over the edge of the box, and means for imparting a second pressure to all sides of the upper part of the box to affix the folded-in portion of the covering material to the interior of the box.

30. In a box-covering machine, the combination with a reciprocating plunger adapted to support and carry the box to be covered, of means for affixing the covering material to the sides and ends of the box, means for tucking the covering material over the edge of the box, devices acting upon the outside of box to hold the sides and ends of the latter square during the operation of the tuck-in means, and mechanism for moving said holding devices to cause them to impart a pressure to the outside of the box.

31. In a box-covering machine, the combination with means for affixing the covering material to the sides and ends of the box, of means for tucking the covering material over the edge of the box, means acting upon the outside of the box to hold the sides and ends thereof square during the operation of the tuck-in means, and mechanism for moving said holding means away from the box after the tuck-in means have acted.

32. In a box-covering machine, the combination with means for affixing the covering material to the sides and ends of the box, of means for tucking the covering material over the edge of the box, and means movable to and from the path of movement of the box operating to impart a pressure to the outer sides of the box after the tuck-in means have acted.

33. In a box-covering machine, the combination with means for supporting the box to be covered, of covering devices, means for causing said box-supporting means to move back and forth between the covering devices, means for moving the covering devices out of the path of movement of the box-support during one stroke of the latter, and means for returning said covering devices to their operative position.

34. In a box-covering machine, the combination with a vertically-reciprocating plunger adapted to support the box to be covered, of upwardly-tilting covering-rollers, means for causing the plunger to travel between said rollers, means for causing said rollers to move up and out of the path of movement of the plunger during the return stroke of the latter, and means for positively moving said rollers down into their operative position.

35. In a box-covering machine, the combination with covering-rollers, of pivoted supports therefor, means operatively connected to said supports whereby they are tilted to move the covering-rollers out of operative position, and springs arranged to return said covering-rollers to their operative position.

36. In a box-covering machine, the combination with an adjustable bracket, of a rod journaled therein, blocks fixed to the opposite ends of said rod, a covering-roller supported by said blocks, means for rocking said rod in one direction to move the covering-roller out of operative position, and a coiled spring for rocking said rod in the opposite direction to return the covering-roller to operative position.

37. In a box-covering machine, the combination with means for affixing the covering material to the sides and ends of the box, means for imparting a pressure to all sides of the box after the covering material has been affixed thereto, means for folding the edge of the covering material over the edge and down the inside of the box, and means for imparting a second and final pressure to the upper portion of all sides of the box after the covering material has been folded down into the interior thereof, for the purpose specified.

38. In a box-covering machine, the combination with movable covering devices for folding the covering material up against the sides and ends of the box, of angle-levers operatively connected to said covering devices, loops attached to said angle-levers, a rising and falling frame, laterally-projecting arms carried by said frame and loosely engaging said loops to rock said angle-levers and move the covering devices out of operative position, substantially as described.

39. In a box-covering machine, the combination with movable covering devices for folding the covering material up against the sides and ends of the box, of angle-levers operatively connected to said covering devices, loops adjustably attached to said angle-levers, a rising and falling frame, and laterally-projecting arms carried by said frame and loosely engaging said loops to rock said angle-levers and move the covering devices out of operative position, substantially as described.

40. In a box-covering machine, the combination with movable covering devices for folding the covering material up against the sides and ends of the box, of angle-levers operatively connected to said covering devices, loops provided with vertical slotted shanks, bolts carried by the angle-levers and passing through the slotted shanks of the loops, a rising and falling frame, and laterally-projecting arms carried by said frame and loosely engaging said loops to rock the angle-levers and move the covering devices out of operative position, substantially as described.

41. In a box-covering machine, the combination with movable covering devices for folding the covering material up against the sides and ends of the box, of angle-levers, links loosely connected to said angle-levers and pivotally connected to said covering devices, loops adjustably attached to said angle-levers, a rising and falling frame, and laterally-projecting arms carried by said frame and loosely engaging said loops to rock said angle-levers and move the covering devices out of operative position.

42. In a box-covering machine, the combination with movable covering devices for folding the covering material up against the sides and ends of the box, of angle-levers, links pivotally connected to the covering devices and loosely connected to the angle-levers by a pin-and-slot connection, and means for rocking the angle-levers to move the covering devices out of operative position.

43. In a box-covering machine, the combination with movable covering devices for folding the covering material up against the sides and ends of the box, of angle-levers, links pivotally connected to the covering devices and loosely connected to the angle-levers by a pin-and-slot connection, means for rocking the angle-levers to move the covering devices out of operative position, and springs for returning the covering devices to operative position.

44. In a box-covering machine, the combination with means for supporting the box to be covered, of covering devices for affixing the covering material to the sides and ends of the box, means for moving the box-support between the covering devices, means for folding the covering material over the edges of the box after it has passed through the covering devices, means for imparting a pressure to all sides of the box during the operation of the edge-folding means, means for moving the covering devices out of operative position during the return movement of the box-support, and means for stripping the covered box from said support.

45. In a box-covering machine, the combination with means for supporting the box to be covered, of covering devices for affixing the covering material to the sides and ends of the box, means for moving the box-support between the covering devices, means for folding the covering material over the edges of the box after it has passed through the covering devices, means for imparting a pressure to all sides of the box during the operation of the edge-folding means, and means for stripping the covered box from said support.

46. In a box-covering machine, the combination with means for supporting the box to be covered, of covering devices for affixing the covering material to the sides and ends of the box, means for moving the box-support between the covering devices, means for folding the covering material over the edges of the box after it has passed through the covering devices, means for imparting a pressure to all sides of the box during the operation of the edge-folding means, means for folding down the covering material on the inside of the box, means for imparting a second pressure to all sides of the box after the folding-down means have acted, and stripper mechanism for stripping the covered box from the said support.

47. In a box-covering machine, the combination with means for supporting the box to be covered, of covering devices for affixing the covering material to the sides and ends of the box, means for moving the box-support between the covering devices, means for folding the covering material over the edges of the box after it has passed through the covering devices, means for imparting a pressure to all sides of the box during the operation of the edge-folding means, means for folding down the covering material on the inside of the box, means for imparting a second pressure to all sides of the box after the folding-down means have acted, means for moving the covering devices out of operative position during the return movement of the box-support, and means for stripping the covered box from said support.

48. In a box-covering machine, the combination with means for supporting the box to be covered, of covering devices for affixing the covering material to the sides and ends of the box, means for moving the box-support between the covering devices, means for folding the covering material over the edges of the box after it has passed through the covering devices, means for imparting a pressure to all sides of the box during the operation of the edge-folding means, means for folding down the covering material on the inside of the box, means for imparting a second pressure to all sides of the box after the folding-down means have acted, means for moving the covering device out of operative position during the return movement of the support, and means for returning the covering devices to operative position.

49. In a box-covering machine, the combination with a vertically-movable two-part plunger adapted to support the box to be covered, of covering devices for affixing the covering material to the sides and ends of the box, means for moving the plungers between the covering devices, means for arresting the movement of the upper part of the plunger, means for tucking in the covering material between the two parts of the plunger and over the edge of the box, and means for forcing down the upper part of the plunger into the box to fold down the covering material into the inside of the box after the tuck-in devices have been retracted, substantially as described.

50. In a box-covering machine, the combination with a vertically-movable two-part plunger adapted to support the box to be covered, of covering devices for affixing the covering material to the sides and ends of the box, means for moving the plunger between the covering devices, means for arresting the movement of the upper part of the plunger during the descent of the lower part of the plunger and box to separate the two parts of the plunger and lower the box from off the upper part of the plunger, means for tucking in the covering material between the two parts of the plunger and over the edge of the box, and means for arresting the movement of the lower part of the plunger and forcing down the upper part of the plunger into the box to fold down the covering material into the inside of the box after the tuck-in devices have been retracted.

51. In a box-covering machine, the combination with a vertically-movable two-part plunger adapted to support the box to be covered, of covering devices for affixing the covering material to the sides and ends of the box, means for moving the plunger between the covering devices, means for arresting the movement of the upper part of the plunger during the descent of the lower part thereof to separate the two parts of the plunger and lower the box from off the upper part of the plunger, means for tucking in the covering material between the two parts of the plunger and over the edge of the box, means for imparting a pressure to all sides of the box during the operation of the tuck-in devices, means for forcing down the upper part of the plunger into the box to fold down the covering material into the inside of the box, and means for imparting a second pressure to all sides of the box after the covering material has been folded down therein.

52. In a box-covering machine, the combination with a vertically-movable two-part plunger adapted to support the box to be covered, of covering devices for affixing the covering material to the sides and ends of the box, means for moving the plunger between the covering devices, means for separating the two parts of the plunger, means for tucking in the covering material between the two parts of the plunger, means for imparting a pressure to all sides of the box about the lower part of the plunger, means for forcing down the upper part of the plunger into the box to fold down the covering material into the inside of the box, and means for imparting a second pressure to all sides of the box about the upper part of the plunger.

53. In a box-covering machine, the combination with a vertically-movable two-part plunger adapted to support the box to be covered, of covering devices for affixing the covering material to the sides and ends of the box, means for moving the plunger between the covering devices, means for arresting the movement of the upper part of the plunger during the descent of the lower part thereof to separate the two parts of the plunger and to lower the box from off the upper part of the plunger, means for tucking in the covering material between the two parts of the plunger and over the edge of the box, means for imparting a pressure to all sides of the box about the lower part of the plunger during the operation of the tuck-in devices, means for forcing down the upper part of the plunger into the box to fold down the covering material into the inside of the box, means for moving down both parts of the plunger to bring the upper part thereof between the pressing device, and means for imparting a second pressure on all sides of the box about the upper part of the plunger.

54. In a box-covering machine, the combination with a vertically-movable plunger adapted to support the box to be covered, of a vertically-yielding platen arranged beneath the plunger, covering devices for affixing the covering material to the sides and ends of the box, and means for moving the plunger down onto the platen at a relatively rapid rate of speed and for then moving the plunger and platen down between the covering devices at a slower rate of speed.

55. In a box-covering machine, the combination with a vertically-movable plunger adapted to support the box to be covered, of a vertically-yielding platen arranged beneath the plunger, covering devices for affixing the covering material to the sides and ends of the box, a pivoted lever connected with and arranged to reciprocate the plunger, a friction-roller carried by the lever, a cam provided with a cam-groove engaged by said friction-roller, said cam-groove having a double inclined portion, one portion being more abruptly inclined than the other, whereby the plunger is moved down onto the platen at a relatively rapid rate and then between the covering devices at a slower rate.

56. In a box-covering machine, the combination with a movable box-support and covering devices for affixing the covering material to the sides and ends of the box, of edge-tuck-in devices each consisting of an arm provided with a loop or eye at one end, a flat bar attached intermediate its ends to the other end of the arm, a rocking lever for actuating said arm and means for oscillating said rocking lever, the loop or eye on the said arm being removably fitted over the free end of the rocking lever.

57. In a box-covering machine, the combination with a movable box-support and covering devices for affixing the covering material to the sides and ends of the box, of edge-tuck-in devices for tucking in the covering material over the edge of the box, said tuck-in devices comprising arms each provided with a loop or eye at one end, flat bars attached to said arms, angle-levers on which said loops or eyes are removably fitted, and means for oscillating said angle-levers to simultaneously move said bars inward toward one another.

58. In a box-covering machine, the combination with a movable box-support and covering devices for affixing the covering material to the sides and ends of the box, of edge-tuck-in devices for tucking in the covering material over the edge of the box, said tuck-in devices consisting of flat bars having attached arms provided with loops or eyes, rocking levers on which said loops or eyes are removably and adjustably fitted, means for holding the loops or eyes in their adjusted positions, and means for oscillating said rocking levers.

59. In a box-covering machine, the combination with a movable box-support and covering devices for affixing the covering material to the sides and ends of the box, of edge-tuck-in devices for tucking in the covering material over the edge of the box, said tuck-in devices consisting of flat bars having attached arms provided at their ends with angular loops or eyes, rocking levers angular in cross-section on which said loops or eyes are fitted, and means for oscillating said rocking levers.

60. In a box-covering machine, the combination with a reciprocating plunger adapted to support the box to be covered, of covering devices between which said plunger moves for affixing the covering material to the sides and ends of the box, and brushes arranged to engage the sides of the plunger and clean the latter.

61. In a box-covering machine, the combination with means for supporting and carrying the box to be covered, of covering devices between which said box-support moves for affixing the covering material to the sides and ends of the box, and brushes arranged to engage the sides of the box-support as the latter is retracted and clean the same.

62. In a box-covering machine, the combination with a reciprocating plunger adapted to support and carry the box to be covered, of covering devices between which the plunger moves to affix the covering material to the sides and ends of the box, and brushes constructed to engage the plunger as it is withdrawn from the box and clean its sides.

63. In a box-covering machine, the combination with a reciprocating plunger adapted to support and carry the box to be covered, of covering devices between which the plunger moves to affix the covering material to the sides and ends of the box, brushes adapted to engage the sides of the plunger to clean the latter, and means for moving said brushes into contact with the plunger as the latter is withdrawn from the box.

64. In a box-covering machine, the combination with a reciprocating plunger adapted to support and carry the box to be covered, of covering devices between which the plunger moves to affix the covering material to the sides and ends of the box, brushes adapted to engage the sides of the plunger to clean the latter, strippers arranged to engage the box and hold the latter stationary as the plunger is retracted to withdraw the plunger from the box and means for moving said brushes and strippers into operative position as the plunger approaches the end of its retractile movement.

65. In a box-covering machine, the combination with a reciprocating plunger adapted to support and carry the box to be covered, of covering devices between which the plunger moves to affix the covering material to the sides and ends of the box, brushes adapted to engage the sides of the plunger to clean the latter as it is withdrawn from the box, and strippers actuated by the brushes and arranged to engage the upper edge of the box and hold the latter as the plunger is withdrawn.

66. In a box-covering machine, the combination with a reciprocating plunger adapted to support and carry the box to be covered, of covering devices between which said plunger moves to affix the covering material to the sides and ends of the box, brushes arranged to engage the sides of the plunger to clean the latter as it is withdrawn from the box, and strippers carried by the brushes and arranged to engage the upper edge of the box and hold the latter stationary as the plunger is withdrawn.

67. In a box-covering machine, the combination with a reciprocating plunger adapted to support and carry the box to be covered, of covering devices between which said plunger moves to affix the covering material to the sides and ends of the box, brushes arranged to engage the sides of the plunger and clean the latter as it is withdrawn from the box, and laterally-adjustable strippers carried by the lower edges of the brushes and arranged to engage the edge of the box and hold the latter stationary as the plunger is withdrawn.

68. In a box-covering machine, the combination with a reciprocating plunger adapted to support and carry the box to be covered, of covering devices between which said plunger moves to affix the covering material to the sides and ends of the box, brushes arranged to engage the sides of the plunger and clean the latter as it is withdrawn from the box, and strippers consisting of metallic blades transversely slotted and adjustably secured to the lower edges of the backs of the brushes by screws passing through said slots.

69. In a box-covering machine, the combination with a movable support for supporting and carrying the box to be covered and covering devices for affixing the covering material to the sides and ends of the box, of cleaning devices arranged to engage the sides of the box-support and clean the latter as it is withdrawn from the box.

70. In a box-covering machine, the combination with a movable support for supporting and carrying the box to be covered, and covering devices for affixing the covering material to the sides and ends of the box, of cleaning devices arranged to engage the sides of the box-support and clean the latter, an oscillating lever, intermediate connections connecting said lever and cleaning devices, and means for oscillating said lever to cause the cleaning devices to engage the box-support as it is withdrawn from the box.

71. In a box-covering machine, the combination with a movable support for supporting and carrying the box to be covered, and covering devices for affixing the covering material to the sides and ends of the box, of cleaning devices arranged to engage the sides of the box-support and clean the latter, strippers carried by the cleaning devices and arranged to engage the edge of the box and hold it stationary as the box-support is withdrawn therefrom, an oscillating lever, intermediate connections connecting said lever and cleaning devices, and means for oscillating said lever to cause the cleaning devices to engage the sides of the box-support and the strippers to engage the box and hold the latter stationary as the box-support is withdrawn therefrom.

72. In a box-covering machine, the combination with a movable support for supporting and carrying the box to be covered, and covering devices for affixing the covering material to the sides and ends of the box, of cleaning devices arranged to engage the sides of the box-support and clean the latter, a pivoted lever, intermediate connections connecting said lever and cleaning devices, a friction-roller on the lever, and a cam engaging said lever and operating to cause the cleaning devices to engage the sides of the box-support as the latter is withdrawn from the box.

73. In a box-covering machine, the combination with a movable support for supporting and carrying the box to be covered, and covering devices for affixing the covering material to the sides and ends of the box, of cleaning devices arranged to engage the sides of the box-support, strippers carried by the cleaning devices and arranged to engage the edge of the box, a pivoted lever, intermediate connections connecting said lever and cleaning devices, a friction-roller on the lever, and a cam engaging said friction-roller and operating to cause the cleaning devices to engage the sides of the box-support and the strippers to engage the edge of the box and hold the latter stationary as the box-support is withdrawn therefrom.

74. In a box-covering machine, the combination with a movable box-support for supporting and carrying the box to be covered, and covering devices for affixing the covering material to the sides and ends of the box, of cleaning devices arranged to engage and clean the sides of the box-support as the latter is withdrawn from the box, and means for adjusting said cleaning devices toward and from one another to operate on box-supports of different sizes.

75. In a box-covering machine, the combination with a movable box-support for supporting and carrying the box to be covered, and covering devices for affixing the covering material to the sides and ends of the box, of cleaning devices arranged to engage and clean the sides of the box-support, strippers carried by said cleaning devices, means for causing said cleaning devices to engage the sides of the box-support and the strippers to engage the edge of the box and hold the latter stationary as the box-support is withdrawn therefrom, and means for simultaneously adjusting said cleaning devices and strippers respectively toward one another to operate on box-supports and boxes of different sizes.

76. In a box-covering machine, the combination with a movable box-support for supporting and carrying the box to be covered, and covering devices for affixing the covering material to the sides and ends of the box, of a movable yoke arranged above the box-support and provided with four laterally-projecting arms disposed at right angles to one another, cleaning devices adjustable on said arms toward and from one another to engage and clean the sides of different-sized box-supports, movable rods connected to and carrying said yoke, and an oscillating lever for reciprocating said rods to cause the cleaning devices to engage and clean the sides of the box-support as the latter is withdrawn from the box.

77. In a box-covering machine, the combination with a movable box-support for supporting and carrying the box to be covered, and covering devices for affixing the covering material to the sides and ends of the box, of a movable yoke arranged above the box-support and provided with four laterally-projecting arms disposed at right angles to one another, cleaning devices adjustable on said arms in the direction in which the box-support moves to enable said cleaning devices to engage and clean the sides of box-supports of different sizes, movable rods connected to and carrying said yoke, and an oscillating lever for reciprocating said rods to cause the cleaning devices to engage and clean the sides of the box-support as the latter is withdrawn from the box.

78. In a box-covering machine, the combination with a movable box-support for supporting and carrying the box to be covered, and covering devices for affixing the covering material to the sides and ends of the box, of a movable yoke arranged above the box-support and provided with four laterally-projecting arms disposed at right angles to one another, cleaning devices adjustable on said arms toward and from one another, strippers carried by said cleaning devices, movable rods connected to and carrying said yoke, and an oscillating lever for reciprocating said rods to cause the strippers to engage and hold the box stationary and the cleaning devices to engage and clean the sides of the box-support as the latter is withdrawn from the box.

79. In a box-covering machine, the combination with a movable box-support for supporting and carrying the box to be covered, and covering devices for affixing the covering material to the sides and ends of the box, of a movable yoke arranged above the box-support and provided with four laterally-projecting arms arranged at right angles to one another, cleaning devices adjustable on said arms toward and from one another and in the direction in which said box-support moves, strippers carried by said cleaning devices, movable rods connected to and carrying said yoke, and an oscillating lever for reciprocating said rods to cause the strippers to engage and hold the box stationary and the cleaning devices to engage and clean the sides of the box-support as the latter is withdrawn from the box.

80. In a box-covering machine, the combination with a movable box-support, and covering devices for affixing the covering material to the sides and ends of the box, of edge-tuck-in devices for tucking in the covering material over the edges of the box, and presser-blocks arranged to simultaneously engage the sides and ends of the box and impart a yielding pressure thereto.

81. In a box-covering machine, the combination with a movable box-support and covering devices for affixing the covering material to the sides and ends of the box, of presser devices arranged to simultaneously engage the sides and ends of the box and impart a yielding pressure thereto, edge-tuck-in devices for tucking in the covering material over the edges of the box, and means operating to first move the presser devices into contact with the box and while said presser devices are so held to actuate the edge-tuck-in devices.

82. In a box-covering machine, the combination with a movable box-support, and covering devices for affixing the covering material to the sides and ends of the box, of presser devices arranged to simultaneously engage the sides and ends of the box and impart a pressure thereto, rocking levers, edge-tuck-in devices carried on the free ends of said levers and operating to tuck in the covering material over the edges of the box, and yielding connections between said presser devices and rocking levers, whereby said levers first operate to move the presser devices into contact with the box and the yielding connections yield to permit the levers to actuate the tuck-in devices to tuck in the covering material while the box is under pressure.

83. In a box-covering machine, the combination with a movable box-support, and covering devices for affixing the covering material to the sides and ends of the box, of presser devices arranged on all four sides of the path of movement of the box-support, means for simultaneously moving said presser devices toward each other to press the box on all sides, and means for retracting the presser devices.

84. In a box-covering machine, the combination with a movable box-support and covering devices for affixing the covering material to the sides and ends of the box, of presser devices arranged on all four sides of the path of movement of the box-support, rocking levers for simultaneously moving said presser devices toward each other to press the box on all sides, and springs arranged to retract the presser devices after the rocking levers have acted.

85. In a box-covering machine, the combination with a movable box-support, and covering devices for affixing the covering material to the sides and ends of the box, of presser devices arranged on all four sides of the path of movement of the box-support, means for moving said presser devices toward each other to press the box on all sides, and means for retracting said presser devices and holding them in their retracted positions while the box is withdrawn from between them.

86. In a box-covering machine, the combination with a movable box-support, and covering devices for affixing the covering material to the sides and ends of the box, of presser devices arranged on all four sides of the path of movement of the box-support, rocking levers for moving said presser devices toward each other to press the box on all sides, means for retracting the presser devices, and auxiliary means actuated by the reverse movement of the rocking levers for causing the presser devices to advance and impart a second pressure to the box.

87. In a box-covering machine, the combination with a movable box-support, and covering devices for affixing the covering material to the sides and ends of the box, of presser devices arranged on all four sides of the path of movement of the box-support, rocking levers for moving said presser devices toward each other to press the box on all sides, springs for retracting the presser devices, and cam mechanism actuated by the reverse movement of the rocking levers for causing the presser devices to advance and impart a second pressure to the box.

88. In a box-covering machine, the combination with a movable box-support, and covering devices for affixing the covering material to the sides and ends of the box, of presser devices arranged on all four sides of the path of movement of the box-support and each comprising a laterally-movable bar, a presser-block carried by said bar, and a rocking lever arranged to press the bar toward the side of the box.

89. In a box-covering machine, the combination with a movable box-support, and covering devices for affixing the covering material to the sides and ends of the box, of presser devices arranged on opposite sides of the path of movement of the box-support and each comprising a laterally-movable bar, a presser-block carried by said bar, means for adjusting the presser-block on the bar, and a rocking lever arranged to press the bar toward the side of the box.

90. In a box-covering machine, the combination with a movable box-support, and covering devices for affixing the covering material to the sides and ends of the box, of presser devices arranged on opposite sides of the path of movement of the box-support and each comprising a laterally-movable longitudinally-slotted bar, a presser-block fitted in the groove in said bar, adjusting-screws for projecting the presser-block from out of said groove, and a rocking lever arranged to press the bar toward the side of the box.

91. In a box-covering machine, the combination with a movable box-support, and covering devices for affixing the covering material to the sides and ends of the box, of presser devices arranged on opposite sides of the path of movement of the box-support and each comprising a laterally-movable longitudinally-slotted bar, a presser-block fitted in the groove in said bar and provided on its inner edge with a wear-plate, adjusting-screws carried by said bar and bearing against the wear-plate to project the presser-block from out said groove, and a rocking lever arranged to press the bar toward the side of the box.

92. In a box-covering machine, the combination with a movable box-support, and covering devices for affixing the covering material to the sides and ends of the box, of presser devices arranged on the opposite sides of the path of movement of the box-support and each comprising a laterally-movable bar, a presser-block carried by said bar, an oscillating lever, and a yielding pushing device interposed between said bar and rocking lever whereby the latter operates to force the presser-block against the side of the box with a yielding pressure.

93. In a box-covering machine, the combination with a movable box-support, and covering devices for affixing the covering material to the sides and ends of the box, of presser devices arranged on the opposite sides of the path of movement of the box-support and each comprising a laterally-movable bar, a presser-block carried by said bar, an oscillating lever, a yielding pushing device interposed between said bar and lever whereby the latter operates to force the presser-block against the side of the box with a yielding pressure, and springs arranged to retract the presser-block on the reverse movement of the rocking lever.

94. In a box-covering machine, the combination with a movable box-support, and covering devices for affixing the covering material to the sides and ends of the box, of presser devices arranged on the opposite sides of the path of movement of the box-support and each comprising a laterally-movable bar, a presser-block carried by said bar, an oscillating lever, a yielding pushing device interposed between said bar and rocking lever, and an edge-tuck-in device carried by the free end of said lever, the arrangement being such that the rocking lever first operates to force the presser-block against the box and the pushing device then yields to permit the edge-tuck-in device to tuck the covering material over the edge of the box.

95. In a box-covering machine, the combination with a movable box-support, and covering devices for affixing the covering material to the sides and ends of the box, of presser devices arranged on the opposite sides of the path of movement of the box-support and each comprising a laterally-movable bar, a presser-block carried by said bar, an oscillating lever, a yielding pushing device interposed between said bar and rocking lever, an edge-tuck-in device carried by the free end of the rocking lever and operating to tuck in the covering material over the edge of the box after the presser-block has been pressed thereagainst, and springs arranged to retract the presser-block on the reverse movement of the rocking lever.

96. In a box-covering machine, the combination with a movable box-support, and covering devices for affixing the covering material to the sides and ends of the box, of presser devices arranged on the opposite sides of the path of movement of the box-support and each comprising a laterally-movable bar, a presser-block carried by the bar, an oscillating lever, a yielding pushing device interposed between said bar and a part of the rocking lever between its free end and its fulcrum, an edge-tuck-in device carried by the free end of the lever and operating to tuck in the covering material over the edge of the box, and means for oscillating the rocking lever whereby the latter first moves the presser-block against the side of the box and the pushing device then yields to permit the edge-tuck-in device to act.

97. In a box-covering machine, the combination with a vertically-movable box-support, and covering devices for affixing the covering material to the sides and ends of the box, of presser devices arranged on opposite sides of the path of movement of the box-support and each comprising a stationary bracket, a laterally-movable bar supported by said bracket, a presser-block carried by said bar, a bolt arranged in a bearing on the bracket, a spring arranged behind said bolt, and a rocking lever arranged to compress said spring and force the bolt against the bar and thereby press the presser-block against the side of the box.

98. In a box-covering machine, the combination with a vertically-movable box-support, and covering devices for affixing the covering material to the sides and ends of the box, of presser devices arranged on opposite sides of the path of movement of the box-support and each comprising a stationary bracket, a laterally-movable bar supported by said bracket, a presser-block carried by said bar, a bolt arranged in a bearing on the bracket, a spring arranged behind said bolt, a rocking lever arranged to compress said spring and force the bolt against the bar to press the presser-block against the side of the box, and an edge-tuck-in device carried by the free end of the rocking lever to tuck in the covering material over the edge of the box.

99. In a box-covering machine, the combination with a vertically-movable box-support, and covering devices for affixing the covering material to the sides and ends of the box, of presser devices arranged on opposite sides of the path of movement of the box-support and each comprising a stationary bracket, a laterally-movable bar supported by said bracket, a presser-block carried by said bar, a bolt arranged in a bearing on the bracket, a spring arranged behind said bolt, a push-pin arranged in the bearing behind said spring, and a rocking lever arranged to engage the push-pin and compress the spring whereby the presser-block is forced against the side of the box with a yielding pressure.

100. In a box-covering machine, the combination with a vertically-movable box-support, and covering devices for affixing the covering material to the sides and ends of the box, of presser devices arranged on opposite sides of the path of movement of the box-support and each comprising a stationary bracket, a laterally-movable bar supported by said bracket, a presser-block carried by said bar, a bolt arranged in a bearing on the bracket and provided with a rearwardly-projecting stem, a push-pin arranged in said bearing behind the bolt and provided at its inner end with a socket in which said stem is movably fitted, a coiled spring disposed about the stem between the bolt and push-pin, and a rocking lever arranged to engage the push-pin and compress the spring whereby the presser-block is forced against the side of the box with a yielding pressure.

101. In a box-covering machine, the combination with a vertically-movable box-support, and covering devices for affixing the covering material to the sides and ends of the box, of presser devices arranged on the opposite sides of the path of movement of the box-support and each comprising a stationary bracket, a laterally-movable bar supported by said bracket, a presser-block carried by said bar, a rocking lever, a yielding pushing device interposed between said bar and lever, an edge-tuck-in device arranged on the free end of the rocking lever, a cam projection on the rear edge of the said bar, a rocking cam disposed opposite the cam projection, and means for rocking the cam against the cam projection on the reverse movement of the rocking lever, whereby the rocking lever first operates to press the presser-block against the side of the box and then advances the edge-tuck-in device to tuck in the covering material over the edge of the box, and as the edge-tuck-in device is retracted by the reverse movement of the rocking lever the cam operates to advance the presser-block and impart a second pressure to the box.

102. In a box-covering machine, the combination with a vertically-movable box-support, and covering devices for affixing the covering material to the sides and ends of the box, of presser devices arranged on opposite sides of the path of movement of the box-support and each comprising a stationary bracket, a laterally-movable bar supported by said bracket, a presser-block carried by said bar, a rocking lever, a yielding pushing device interposed between said bar and lever, an edge-tuck-in device carried by the free end of the latter, a cam projection on the rear edge of the said bar, a rock-shaft disposed opposite the cam projection, a cam fixed on the rock-shaft in position to engage the cam projection and move the presser-block forward, means for retracting the presser-block, and means actuated by the reverse movement of the rocking lever for oscillating said rock-shaft to impart a second pressure to the box.

103. In a box-covering machine, the combination with a vertically-movable box-support, and covering devices for affixing the covering material to the sides and ends of the box, of presser devices arranged to press all sides of the box and each comprising a stationary bracket, a laterally-movable bar supported by said bracket, a presser-block carried by said bar, a rocking lever, a yielding pushing device interposed between said bar and lever, an edge-tuck-in device carried by the free end of the lever, springs arranged to retract the presser-block on the reverse movement of the rocking lever, a cam projection on the rear edge of the said bar, a rock-shaft disposed opposite the cam projection, a cam fixed on the rock-shaft in position to engage the cam projection and move the presser-block forward, and means actuated by the reverse movement of the rocking lever for oscillating said rock-shaft to impart a second pressure to the box.

104. In a box-covering machine, the combination with a vertically-movable box-support, and covering devices for affixing the covering material to the sides and ends of the box, of presser devices arranged to press all sides of the box and each comprising a stationary bracket, a laterally-movable bar supported by said bracket, a presser-block carried by said bar, an angle-lever, a yielding pushing device interposed between said bar and one end of the lever, an edge-tuck-in device fitted on the said end of the lever, a link connected to the other end of said lever, springs for retracting the presser-block on the reverse movement of the lever, a cam projection on the rear edge of the said bar, a rock-shaft journaled in the bracket opposite the cam projection, a cam fixed on the rock-shaft in position to engage the cam projection, and a crank-arm fixed on the rock-shaft and pivotally connected to the said link.

105. In a box-covering machine, the combination with a vertically-movable box-support, and covering devices for affixing the covering material to the sides and ends of the box, of presser devices arranged on opposite sides of the path of movement of the box-support and each comprising a stationary bracket having rearwardly-projecting bracket-arms, rods longitudinally movable in said bracket and bracket-arms, a bar carried by the forward ends of said rods, a presser-block carried by the bar, a rocking lever arranged to force the bar forward to press the presser-block against the side of the box, and coiled springs disposed on the said rods and operating to retract the latter and the presser-block on the reverse movement of the rocking lever.

106. In a box-covering machine, the combination with a vertically-movable box-support, and covering devices for affixing the covering material to the sides and ends of the box, of stationary hangers arranged on all sides of the path of movement of the box-support, presser devices and edge-tuck-in devices supported by each of said hangers, and means for adjusting the hangers toward and from each other whereby the presser devices and edge-tuck-in devices are simultaneously adjusted to operate on boxes of different sizes.

107. In a box-covering machine, the combination with a vertically-movable box-support, of stationary hangers arranged on all sides of the path of movement of the box-support, covering devices for affixing the covering material to the sides and ends of the box, presser devices for imparting a pressure to all sides of the box, and edge-tuck-in devices for tucking in the covering material over the edge of the box, all of said devices being supported by the said hangers, and means for adjusting said hangers toward and from each other whereby the several said devices are simultaneously adjusted to operate upon boxes of different sizes.

108. In a box-covering machine, the combination with a reciprocating box-support, of covering devices for affixing the covering material to the sides and ends of the box, each of said covering devices comprising a stationary yoke, a shaft carried by said yoke, blocks fixed on the ends of said shaft, bearings carried by said blocks, and a covering-roller journaled in said bearings.

109. In a box-covering machine, the combination with a reciprocating box-support, of covering devices for affixing the covering material to the sides and ends of the box, each of said covering devices comprising a stationary yoke, a shaft carried by said yoke, blocks fixed on the ends of said shaft, yielding bearings carried by said blocks, and a covering-roller journaled in the yielding bearings.

110. In a box-covering machine, the combination with a reciprocating box-support, of covering devices for affixing the covering material to the sides and ends of the box, each of said covering devices comprising a stationary yoke, a shaft carried by said yoke, blocks fixed on the ends of the shaft and provided at their outer ends with perforated lugs, rods movably arranged in the perforated lugs and each provided at its inner end with a bearing, a covering-roller journaled in said bearing, and coiled springs disposed about said rods and operating to press the covering-roller toward the path of movement of the box-support.

111. In a box-covering machine, the combination with a reciprocating box-support, of covering devices for affixing the covering material to the sides and ends of the box, each of said covering devices comprising a stationary yoke, a shaft carried by said yoke, blocks fixed on the ends of the shaft, yielding bearings carried by said blocks, a covering-roller journaled in the bearings, and means for locking said blocks to the yoke to prevent the roller from tilting.

112. In a box-covering machine, the combination with a reciprocating box-support, of covering devices for affixing the covering material to the sides and ends of the box, each of said covering devices comprising a stationary yoke, a shaft carried by said yoke, blocks fixed on the ends of the shaft, yielding bearings carried by the blocks, a covering-roller journaled in the bearings, and sliding bolts movably fitted in the ends of the yoke and adapted to engage recesses in the blocks and prevent the covering-rollers from tilting.

113. In a box-covering machine, the combination with a reciprocating box-support, of covering devices for affixing the covering material to the sides and ends of the box, each of said covering devices comprising a stationary yoke, a rock-shaft journaled in the ends of the yoke, blocks fixed on the end of the shaft, yielding bearings carried by the blocks, a covering-roller journaled in said bearings, and means for rocking said shaft to tilt the roller up and away from the path of movement of the box-support.

114. In a box-covering machine, the combination with a reciprocating box-support, of covering devices for affixing the covering material to the sides and ends of the box, each of said covering devices comprising a stationary yoke, a rock-shaft journaled in the ends of the yoke, blocks fixed on the ends of the shaft, yielding bearings carried by the blocks, a covering-roller journaled in said bearings, means for positively rocking said shaft in one direction to tilt the roller up and away from the path of movement of the box-support, and independent means for rocking the shaft in the reverse direction to return the roller to operative position.

115. In a box-covering machine, the combination with a reciprocating box-support, of covering devices for affixing the covering material to the sides and ends of the box, each of said covering devices comprising a stationary yoke, a rock-shaft journaled in the ends of the yoke, blocks fixed on the ends of the shaft, yielding bearings carried by the blocks, a covering-roller journaled in the said bearings, means for positively rocking said shaft in one direction to tilt the roller up and away from the path of movement of the box-support, and a coiled spring disposed about the rock-shaft and operating to rock said shaft in a reverse direction to return the covering-roller to operative position.

116. In a box-covering machine, the combination with a reciprocating box-support, of covering devices for affixing the covering material to the sides and ends of the box, each of said covering devices comprising a stationary yoke, a rock-shaft journaled in the ends of the yoke, blocks fixed on the ends of the shaft, yielding bearings carried by the blocks, a covering-roller journaled in said bearings, a crank-arm on the rock-shaft, an oscillating lever, a link connecting one end of said lever to the crank-arm for rocking the rock-shaft in one direction to tilt the covering-roller up and out of operative position, and a spring for rocking said shaft in the opposite direction to return the covering-roller to operative position.

117. In a box-covering machine, the combination with a reciprocating box-support, of covering devices for affixing the covering material to the sides and ends of the box, each of said covering devices comprising a support, a yoke carried by the support, a tilting covering-roller carried by the yoke, means for tilting the covering-roller up and out of operative position, means for returning it to operative position, and means for adjusting the support toward and from the path of movement of the box-support to accommodate the covering-roller to boxes of different sizes.

118. In a box-covering machine, the combination with a reciprocating box-support, of covering devices for affixing the covering material to the sides and ends of the box, a support for each covering device, and a guard-strip disposed over each covering device and hinged to the said support.

119. In a box-covering machine, the combination with a vertically-reciprocating box-support, of covering devices between which the box-support moves to affix the covering material to the sides and ends of the box, a yielding platen arranged in the path of movement of the box-support, and a strap and weight for holding said platen elevated and permit it to descend under the pressure of the box-support.

120. In a box-covering machine, the combination with a vertically-reciprocating box-support, of covering devices between which the box-support moves to affix the covering material to the sides and ends of the box, a yielding platen arranged in the path of movement of the box-support and comprising a vertically-movable standard carrying a flat plate at its upper end, a strap attached at one end to the lower portion of the standard and passing over an elevated pulley, a weight attached to the other end of the strap and operating in connection with the strap to normally hold the platen elevated, and a stop on the standard arranged to engage a fixed support and limit the upward movement of the platen.

121. In a box-covering machine, the combination with a vertically-reciprocating box-support, of covering devices between which the box-support moves to affix the covering material to the sides and ends of the box, a yielding platen arranged in the path of movement of the box-support and comprising a vertically-movable standard carrying a flat plate at its upper end, a strap attached at one end to the lower portion of the standard and passing over an elevated pulley, a weight attached to the other end of the strap and operating in connection with the strap to normally hold the platen elevated, a disk fixed on the lower end of the standard, and a cushion carried by said disk and arranged to engage a fixture to limit and cushion the upward movement of the platen.

122. In a box-covering machine, the combination with a vertically-reciprocating box-support, of two sets of covering devices between which the box-support moves to affix the covering material to the sides and ends of the box, said sets of covering devices being arranged in different horizontal planes, and means arranged between said sets of covering devices in proximity to the path of movement of the box-support for engaging and supporting the end flaps of the covering material and guiding them into engagement with the covering devices.

123. In a box-covering machine, the combination with a vertically-reciprocating box-support, of two sets of covering devices between which the box-support moves to affix the covering material to the sides and ends of the box, said sets of covering devices being disposed in different horizontal planes, and horizontal guide-strips arranged between said sets of covering devices in proximity to the path of movement of the box-support for engaging and supporting the side edges of the covering material and guiding their lower sides into engagement with the covering devices.

124. In a box-covering machine, the combination with a vertically-reciprocating box-support, of two sets of covering devices between which the box-support moves to affix the covering material to the sides and ends of the box, said sets of covering devices being disposed in different horizontal planes, horizontal guide-strips arranged between said sets of covering devices for engaging and supporting the side edges of the covering material and guiding their lower sides into engagement with the covering devices, and means for adjusting said guide-strips toward and from the path of movement of the box-support to operate upon boxes of different sizes.

125. In a box-covering machine, the combination with a vertically-reciprocating box-support, and two sets of covering devices between which the box-support moves for successively affixing the covering material to the sides and ends of the box, of end-turn-in devices for turning in the ends of the side flaps of the covering material against the ends of the box, each of said end-turn-in devices comprising a laterally-movable bar, two blocks mounted and longitudinally adjustable on said bar, vertically-adjustable wings or wipers carried by said bar, and means for moving the bars toward each other to cause the wings or wipers to fold the ends of the side flaps against the ends of the box.

126. In a box-covering machine, the combination with a vertically-reciprocating box-support, and two sets of covering devices for successively affixing the covering material to the sides and ends of the box, of end-turn-in devices for turning in the ends of the side flaps of the covering material against the ends of the box, each of said end-turn-in devices comprising a laterally-movable bar, two blocks adjustably mounted on said bar, a rod mounted and transversely adjustable in each of said blocks, vertically-adjustable wings or wipers carried by the inner ends of said rods, and means for moving the bars toward one another to cause the wings or wipers to fold the ends of the side flaps against the ends of the box.

127. In a box-covering machine, the combination with a vertically-reciprocating box-support, and two sets of covering devices for successively affixing the covering material to the sides and ends of the box, of end-turn-in devices for turning in the ends of the side flaps of the covering material against the ends of the box, each of said end-turn-in devices comprising a laterally-movable bar, two blocks longitudinally adjustable on the bar, set-screws carried by the blocks for holding them in their adjusted positions, rods mounted in and adjustable transversely relative to said blocks, set-screws carried by the blocks for holding the rods in their adjusted positions, vertical wings or wipers carried by the inner ends of said rods, and means for moving the said bars toward one another to cause the wings or wipers to fold the ends of the side flaps against the ends of the box.

128. In a box-covering machine, the combination with a vertically-reciprocating box-support, and two sets of covering devices for successively affixing the covering material to the sides and ends of the box, of end-turn-in devices for turning in the ends of the side flaps of the covering material against the ends of the box, each of said end-turn-in devices comprising a laterally-movable bar, two blocks longitudinally adjustable on said bar, a rod longitudinally adjustable transversely in each of said blocks, a vertically-disposed approximately flat blade having a depending vertically-slotted extension adjustably mounted on the inner end of each of said rods by a set-screw carried by the rod and passing through said slotted extension, and means for moving the said bars toward each other to cause the blades to fold the ends of the side flaps against the ends of the box.

129. In a box-covering machine, the combination with a vertically-reciprocating box-support, and two sets of covering devices for successively affixing the covering material to the sides and ends of the box, of two pairs of end-turn-in devices for turning in the ends of the side flaps of the covering material against the ends of the box, means for adjusting said end-turn-in devices toward and from the path of movement of the box-support, means for adjusting said devices in the direction of movement of said support, means for moving said pairs of end-turn-in devices toward each other while the box is held stationary to turn in the ends of the flaps, and means for moving the box from between said end-turn-in devices while the latter are in engagement with the ends of the box.

130. In a box-covering machine, the combination with mechanism for affixing the covering material to the box, of an ejector arranged to automatically eject the box from the machine after the box has been covered, and means for throwing the ejecting mechanism out of operation at will.

131. In a box-covering machine, the combination with a reciprocating box-support, of a rotary shaft having a connection with said support for reciprocating the same, covering devices for affixing the covering material to the box, an ejector disposed to one side of the path of travel of the box-support and arranged to eject the box laterally from the machine after the covering devices have acted on the box, and means controlled by said rotary shaft for actuating said ejector.

132. In a box-covering machine, the combination with box-covering mechanism, of a rotary shaft constituting a part of the operating mechanism of the machine, and an ejector for ejecting the covered box, said ejector comprising an ejector-rod movable endwise in suitable bearings, a compressible spring for thrusting said rod against one side of the box, means operated by said rotary shaft for compressing said spring, means for holding the ejector-rod against the tension of the spring, and means for releasing the rod to permit the spring to thrust it against the box to eject the latter from the machine.

133. In a box-covering machine, the combination with the box-covering mechanism, of a rotary shaft, and an ejector for ejecting the covered box, said ejector comprising an ejector-rod movable endwise in suitable bearings, a compressible spring for forcing said rod against one side of the box, means operated by said shaft for compressing said spring, means for holding the ejector-rod against the tension of the spring, and means operating, after the covering mechanism has ceased to act, to release the ejector-rod and permit the spring to thrust said rod against the side of the box and eject the latter from the machine.

134. In a box-covering machine, the combination with box-covering mechanism, of a rotary shaft, and an ejector for ejecting the covered box, said ejector comprising an ejector-rod movable endwise in suitable bearings, a compressible spring for forcing said rod against one side of the box, means for holding the rod against the tension of the spring, operated by said shaft, operating, after the covering mechanism has ceased to act, to release the ejector-rod and permit the spring to thrust said rod against the side of the machine, and means for automatically restoring the parts of the ejector to their original position.

135. In a box-covering machine, the combination with box-covering mechanism, of an ejector for ejecting the box from the machine after the covering mechanism has acted, said ejector comprising a frame, an ejector-rod lengthwise movable in said frame, a spring for thrusting said rod forward, means for placing said spring under tension, a trigger arranged to engage a projection on the ejector-rod and hold the latter against the tension of the spring, a cam arranged to engage said trigger and release the ejector-rod, and means for automatically advancing said cam into engagement with the trigger to release the ejector-rod and permit the spring to thrust said rod forward and eject the box.

136. In a box-covering machine, the combination with box-covering mechanism, of an ejector for ejecting the covered box from the machine, said ejector comprising a frame, an ejector-rod movable lengthwise in said frame, a spring for forcing said rod forward, a trigger arranged to engage a projection on the ejector-rod and hold the latter against the tension of the spring, a cam arranged to engage said trigger and release the ejector-rod, and means arranged to first place the spring under tension and then move the cam into engagement with the trigger and release the ejector-rod after the covering devices have acted.

137. In a box-covering machine, the combination with box-covering mechanism, of an ejector for ejecting the covered box from the machine, said ejector comprising a frame, an ejector-rod movable lengthwise in the frame, a spring for thrusting said rod forward, a trigger arranged to engage a projection on the ejector-rod and hold the latter against the tension of the spring, a cam arranged to engage the trigger and release the ejector-rod, means arranged to first place the spring under tension and then move the cam into engagement with the trigger and release the ejector-rod after the covering devices have acted, and means for adjusting the said projection longitudinally on the ejector-rod to vary the stroke of the latter.

138. In a box-covering machine, the combination with box-covering mechanism, of an ejector for ejecting the covered box from the machine, said ejector comprising a frame, an ejector-rod movable lengthwise in the frame, a spring for thrusting said rod forward, a trigger arranged to engage a projection on the ejector-rod and hold the latter against the tension of the spring, a cam arranged to engage the trigger and release the ejector-rod, means constructed to first place the spring under tension and then move the cam into engagement with the trigger and release the ejector-rod after the covering devices have acted, and means for varying the tension of the spring to regulate the force with which the ejector-rod strikes the box.

139. In a box-covering machine, the combination with box-covering mechanism, of an ejector for ejecting the covered box from the machine, said ejector comprising a frame, an ejector-rod movable lengthwise in the frame, a spring for thrusting said rod forward, a trigger arranged to engage a projection on the ejector-rod and hold the latter against the tension of the spring, a cam arranged to engage the trigger and release the ejector-rod, means constructed to first place the spring under tension and then move the cam into engagement with the trigger and release the ejector-rod after the covering devices have acted, and means for varying the length and force of the stroke of the ejector-rod.

140. In a box-covering machine, the combination with box-covering mechanism, of an ejector for ejecting the covered box from the machine, said ejector comprising a frame, an ejector-rod movable lengthwise in the frame, a collar adjustably fixed on the ejector-rod, a coiled spring disposed on the said rod in rear of the collar and bearing at one end against the latter, a trigger arranged to engage a projection on the ejector-rod and hold the latter against the tension of the spring, a cam arranged to engage the trigger and release the ejector-rod, and means constructed to first place the spring under tension and then move the cam into engagement with the trigger and release the ejector-rod after the covering devices have acted.

141. In a box-covering machine, the combination with box-covering mechanism, of an ejector for ejecting the covered box from the machine, said ejector comprising a frame, an ejector-rod movable lengthwise in the frame, a spring for thrusting said rod forward, a pivoted trigger arranged to engage a projection on the ejector-rod and hold the latter against the tension of the spring, a cam arranged to engage the tail of the trigger and swing the latter from in front of the said projection and release the ejector-rod, and means for first compressing the spring and then causing the cam to engage the trigger and release the ejector-rod after the covering mechanism has acted.

142. In a box-covering machine, the combination with box-covering mechanism, of an ejector for ejecting the covered box from the machine, said ejector comprising a frame, an ejector-rod movable lengthwise in the frame, a spring for thrusting said rod forward, a pivoted trigger arranged to engage a projection on the ejector-rod and hold the latter against the tension of the spring, a reciprocating beveled cam arranged to engage the free end of the trigger and oscillate the latter about its pivot to rock the other end of the trigger from in front of the said projection and release the ejector-rod, and means for first compressing the spring and then causing the cam to oscillate the trigger and release the ejector-rod after the covering mechanism has acted.

143. In a box-covering machine, the combination with the box-covering mechanism, of an ejector for ejecting the covered box from the machine, said ejector comprising a frame, an ejector-rod movable lengthwise in the frame, a spring for thrusting said rod forward, a pivoted trigger arranged to engage a projection on the ejector-rod and hold the latter against the tension of the spring, means for normally holding the trigger in position to engage said projection, a cam arranged to engage the free end of the trigger and disengage the latter from said projection to release the ejector-rod, and means for first compressing the spring and then causing the cam to oscillate the trigger and release the ejector-rod after the covering mechanism has acted.

144. In a box-covering machine, the combination with box-covering mechanism, of an ejector for ejecting the box from the machine, said ejector comprising a frame, an ejector-rod movable lengthwise in the frame, a propelling-spring for thrusting the ejector-rod forward, a pivoted trigger arranged to engage a projection on the ejector-rod and hold the latter against the tension of the spring, a trigger-spring for holding one end of the trigger in position to engage the projection, a cam arranged to engage the free end of the trigger and disengage the latter from said projection and release the ejector-rod, and means for first compressing the propelling-spring and then causing the cam to oscillate the trigger and release the ejector-rod after the covering mechanism has acted.

145. In a box-covering machine, the combination with box-covering mechanism, of an ejector for ejecting the box from the machine, said ejector comprising a frame, an ejector-rod movable lengthwise in the frame, a coiled spring disposed on the ejector-rod in rear of a fixture on the latter, a movable support mounted in the frame, means carried by said support for compressing the spring, a pivoted trigger normally engaging a projection on the ejector-rod and holding the latter against the action of the spring, a cam fixed on the movable support and arranged to engage the free end of the trigger and disengage the latter from the projection and release the ejector-rod, and means for moving the said support and causing it to first compress the spring and then release the ejector-rod after the covering mechanism has acted.

146. In a box-covering machine, the combination with box-covering mechanism, of an ejector for ejecting the box from the machine, said ejector comprising a frame, an ejector-rod movable lengthwise in the frame, a coiled spring disposed on the ejector-rod in rear of the fixture on the latter, a rod longitudinally movable in the frame, an arm carried by said rod and arranged to engage and compress said spring, a pivoted trigger normally engaging a projection on the ejector-rod and holding the latter against the action of the spring, a cam fixed on the said rod and arranged to engage the free end of the trigger and disengage the latter from the projection and release the ejector-rod, and means for moving the said rod and causing the arm to first compress the spring and the cam to next disengage the trigger and release the ejector-rod after the covering mechanism has acted.

147. In a box-covering machine, the combination with box-covering mechanism, of an ejector for ejecting the covered box from the machine, said ejector comprising a frame, an ejector-rod movable lengthwise in the frame, a coiled spring disposed on the ejector-rod in rear of a fixture on the latter, a rod longitudinally movable in the frame, an arm carried by said rod and arranged to engage and compress said spring, a pivoted trigger normally engaging a projection on the ejector-rod and holding the latter against the action of the spring, a cam fixed on the said rod and arranged to engage the free end of the trigger and disengage the latter from the projection and release the ejector-rod, means for moving said rod to cause the arm to first compress the spring and the cam to next disengage the trigger from the projection and release the ejector-rod after the covering mechanism has acted, and an extensible spring attached to one end with said rod and at its other end to the rear end of the frame, said spring operating to return the parts to their normal position after the box has been ejected.

148. In a box-covering machine, the combination with box-covering mechanism and a rotary driving-shaft for actuating the same, of an ejector for ejecting the covered box from the machine, said ejector comprising a lengthwise-movable ejector-rod, a coiled spring disposed on the ejector-rod in rear of a fixture on the latter, a movable support, means carried by said support for compressing the spring, a pivoted trigger normally engaging a projection on the ejector-rod and holding the latter against the action of the spring, a cam fixed on the support and arranged to engage the free end of the trigger and disengage the latter from the projection and release the ejector-rod, and an arm fixed on the said driving-shaft and arranged to engage a projection on the movable support to move the latter and first compress the spring and next release the ejector-rod after the box-covering mechanism has acted.

149. In a box-covering machine, the combination with box-covering mechanism, and a rotary driving-shaft for actuating the same, of an ejector for ejecting the covered box from the machine, said ejector comprising a lengthwise-movable ejector-rod, a coiled spring disposed on the ejector-rod in rear of a fixture on the latter, a movable support, means carried by said support for compressing the spring, a pivoted trigger normally engaging a projection on the ejector-rod and holding the latter against the action of the spring, a cam fixed on the support and arranged to engage the free end of the trigger and disengage the latter from the projection and release the ejector-rod, and an arm fixed on the said driving-shaft and provided with an extension adapted to engage a projection on the movable support to move the latter and first compress the spring and next release the ejector-rod, and means whereby said extension may be adjusted to miss the projection on the movable support and render the ejector inoperative.

150. In a box-covering machine, the combination with box-covering mechanism, and a rotary driving-shaft for actuating the same, of an ejector for ejecting the covered box from the machine, said ejector comprising a lengthwise-movable ejector-rod, a coiled spring disposed on the ejector-rod in rear of a fixture on the latter, a movable support, means carried by said support for compressing the spring, a pivoted trigger normally engaging a projection on the ejector-rod and holding the latter against the action of the spring, a cam fixed on the support and arranged to engage the free end of the trigger and disengage the latter from the projection and release the ejector-rod, and an arm fixed on the said driving-shaft and provided at its end with a pivoted extension adapted to be turned in one direction at an angle to said arm and held in alinement with said arm when turned in the opposite direction, said extension being adapted to engage a projection on the movable support to actuate the ejector and to be turned to one side so as to miss said projection and render the ejector inoperative.

151. In a box-covering machine, the combination with covering devices for affixing the covering material to the sides and ends of the box, of edge-tuck-in devices for tucking in the covering material over the edge of the box, a reciprocating two-part plunger adapted to support and carry the box to be covered, said parts of the plunger being superposed one upon the other, means for moving said plunger parts between the covering devices in unison, means for arresting the movement of the upper part of the plunger to move the box from the said part, means for actuating the tuck-in devices while the two parts of the plunger are separated, and means for forcing down the upper part of the plunger into the box to affix the tucked-in portion of the covering material to the inside of the box.

152. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving said plunger parts in unison between the covering devices, means for arresting the movement of the upper part of the plunger while the lower part continues its movement to withdraw the box from off the upper part of the plunger, means for actuating the tuck-in devices while the two parts of the plunger are separated, and means for forcing down the upper part of the plunger into the box and onto the lower part to affix the tucked-in portion of the covering material to the inside of the box.

153. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger and carrying an arm, a projection adapted to be engaged by said arm and arrest the movement of the upper part of the plunger to withdraw the box therefrom, means for actuating the tuck-in devices while the two parts of the plunger are separated, means for lowering said projection to permit the upper part of the plunger to enter the box, and means for positively forcing said upper part of the plunger into the box after the edge-tuck-in devices have acted.

154. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger and carrying an arm, a rocking lever carrying a projection adapted to be engaged by said arm and arrest the movement of the upper part of the plunger to withdraw the box therefrom, means for actuating the tuck-in devices while the two parts of the plunger are separated, means for rocking said arm to lower the projection, and means for positively forcing the upper part of the plunger down into the box after the tuck-in devices have acted.

155. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger, a cam carried by said rod, a rocking lever, a projection on the end of said lever adapted to be engaged by said arm and arrest the movement of the upper part of the plunger to withdraw the box therefrom, a latch carried by said lever and arranged to engage the upper part of the cam, and means for moving said lever downward to permit the cam to descend and to cause the latch to move the cam downward and force the upper part of the plunger into the box.

156. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger, a wedge-shaped cam carried by said rod, a rocking lever, a projection on the end of the lever adapted to be engaged by said arm and arrest the movement of the upper part of the plunger to withdraw the box therefrom, a yielding latch carried by the lever and arranged to be thrust to one side by the cam when the latter descends to engage the projection, means for thrusting said latch into engagement with the top of the cam, and means for moving down said lever to force down the latter and thrust the upper part of the plunger into the box.

157. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger, a wedge-shaped cam carried by said rod, a rocking lever, a projection on the end of the lever adapted to be engaged by said cam and arrest the movement of the upper part of the plunger to withdraw the box therefrom, a pivoted latch carried by the lever and arranged to be thrust to one side by the cam in the descent of the latter to engage the projection, means for moving said latch into engagement with the top of the cam, and means for moving down said lever to permit the cam to descend and to force down the latter and thrust the upper part of the plunger into the box.

158. In a box-covering machine, the combination with covering devices for affixing the covering material to the sides and ends of the box, of edge-tuck-in devices for tucking in the covering material over the edge of the box, a reciprocating two-part plunger adapted to support and carry the box, said parts of the plunger being superposed one upon the other, means for moving the plunger parts in unison between the covering devices, a rod fixed to the upper part of the plunger, a wedge-shaped cam carried by said rod, a rocking lever, a projection on the end of the lever adapted to be engaged by said cam and arrest the movement of the upper part of the plunger to withdraw the box therefrom, a pivoted latch carried by the lever, a spring-actuated beveled bolt carried by said latch and arranged to be thrust to one side by the cam in the descent of the latter to engage the projection, and operating to engage the top of the cam after the latter has passed said bolt, a spring for normally maintaining the latch in position, and means for moving down said lever to permit the cam to descend and to force down the latter and thrust the upper part of the plunger into the box.

159. In a box-covering machine, the combination with a movable box-support and covering devices for affixing the covering material to the sides and ends of the box, of presser devices arranged to simultaneously engage the sides and ends of the box and impart a pressure thereto, edge-tuck-in devices for tucking in the covering material over the edges of the box, and means operating to move the presser devices into contact with the box and while said presser devices are so held to actuate the edge-tuck-in devices.

160. In a box-covering machine, the combination with a movable box-support and covering devices for affixing the covering material to the sides and ends of the box, of presser devices arranged on opposite sides of the path of movement of the box-support, and rocking levers for simultaneously moving said presser devices toward each other to press the box on opposite sides.

161. In a box-covering machine, the combination with a movable box-support, and covering devices for affixing the covering material to the sides and ends of the box, of presser devices arranged on opposite sides of the path of movement of the box-support, means for moving said presser devices toward each other to press the box on opposite sides, means for retracting the presser devices, and auxiliary means actuated by the reverse movement of the means that actuate the presser devices for causing the latter to advance and impart a second pressure to the box.

162. In a box-covering machine, the combination with a movable box-support, and covering devices for affixing the covering material to the sides and ends of the box, of presser devices arranged on opposite sides of the path of movement of the box-support, means for moving said presser devices toward each other to press the box on opposite sides, means for retracting the presser devices, and cam mechanism actuated by the reverse movement of the means that actuate the presser devices for causing the latter to advance and impart a second pressure to the box.

163. In a box-covering machine, the combination with a movable box-support, and covering devices for affixing the covering material to the sides and ends of the box, of presser devices arranged on opposite sides of the path of movement of the box-support and each comprising a laterally-movable bar, a presser-block carried by said bar, and means acting to press the bar toward the side of the box.

164. In a box-machine, the combination with means for supporting and carrying the box, of presser devices arranged on opposite sides of the path of movement of the box supporting and carrying means, means for moving the box-support between the presser devices and for stopping the same when it reaches such position, and means for actuating the presser devices to cause them to act on the outer sides of the box and impart a pressure thereto.

165. In a box-covering machine, the combination with a movable box-support, and covering devices for affixing the covering material to the box, of presser devices arranged on opposite sides of the path of movement of the box-support and each comprising a stationary bracket, a laterally-movable bar supported by said bracket, a presser-block carried by said bar, a rocking lever, an edge-tuck-in device, a cam projection on the rear edge of said bar, a rocking cam disposed opposite the cam projection, and means for rocking the cam against the cam projection on the reverse movement of the rocking lever, whereby the latter operates to move the presser-block against the side of the box and advance the edge-tuck-in device to tuck the covering material over the edge of the box.

166. In a box-covering machine, the combination with a movable box-support, and covering devices for affixing the covering material to the box, of presser devices arranged on opposite sides of the path of movement of the box-support and each comprising a stationary bracket, a laterally-movable bar supported by said bracket, a presser-block carried by the bar, a cam projection on the rear edge of the bar, a rock-shaft disposed opposite the cam projection, a cam fixed on said rock-shaft in position to engage the cam projection and move the presser-block forward, means for retracting the presser-block, and means for actuating said presser-block a second time, before the box-support is moved away from the presser-block to impart a second pressure to the box.

167. In a box-covering machine, the combination with a movable box-support, and covering devices for affixing the covering material to the box, of presser devices arranged on opposite sides of the path of movement of the box-support and each comprising a stationary bracket, rods longitudinally movable in said bracket, a bar carried by the forward ends of said rods, a presser-block carried by the bar, and means acting to force the bar forward to press the presser-block against the side of the box.

In testimony whereof I have hereunto set my hand in presence of two subscribing witnesses.

PHILIP S. SMITH.

Witnesses:
CLINTON BURDIE,
H. B. SMITH.